United States Patent
Pitakdumrongkija et al.

(10) Patent No.: US 9,107,228 B2
(45) Date of Patent: Aug. 11, 2015

(54) RADIO COMMUNICATION SYSTEM AND CONTROL METHOD OF RADIO RESOURCE ALLOCATION

(75) Inventors: Boonsarn Pitakdumrongkija, Tokyo (JP); Hiroaki Aminaka, Tokyo (JP); Yoshikazu Kakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 300 days.

(21) Appl. No.: 13/704,185

(22) PCT Filed: Jun. 17, 2010

(86) PCT No.: PCT/JP2010/004047
§ 371 (c)(1),
(2), (4) Date: Dec. 13, 2012

(87) PCT Pub. No.: WO2011/158297
PCT Pub. Date: Dec. 22, 2011

(65) Prior Publication Data
US 2013/0090055 A1    Apr. 11, 2013

(51) Int. Cl.
*H04B 1/60*     (2006.01)
*H04W 72/08*    (2009.01)
*H04B 7/15*     (2006.01)
*H04W 28/18*    (2009.01)
*H04W 84/04*    (2009.01)
*H04W 72/04*    (2009.01)

(52) U.S. Cl.
CPC ............. *H04W 72/085* (2013.01); *H04B 7/15* (2013.01); *H04W 28/18* (2013.01); *H04W 72/04* (2013.01); *H04W 84/047* (2013.01)

(58) Field of Classification Search
USPC .................................. 455/7–25, 522, 69–70
See application file for complete search history.

(56) References Cited

U.S. PATENT DOCUMENTS

| 7,853,202 B1* | 12/2010 | Visotsky et al. ............... 455/9 |
| 2008/0108369 A1* | 5/2008 | Visotsky et al. ............. 455/455 |
| 2008/0267110 A1* | 10/2008 | Cai et al. ..................... 370/315 |

FOREIGN PATENT DOCUMENTS

| EP | 2 066 084 A1 | 6/2009 |
| WO | 2008/103965 A1 | 8/2008 |
| WO | 2008/127814 A1 | 10/2008 |

OTHER PUBLICATIONS

"Feasibility Study for Further Advancements for E-UTRA (LTE-Advanced)", 3GPP TR 36.912 v9.1.0, Dec. 2009.
"Further Advancements for E-UTRA physical layer aspects", 3GPP TR 36.814 v9.0.0, Mar. 2010.

(Continued)

*Primary Examiner* — Fayyaz Alam
(74) *Attorney, Agent, or Firm* — Sughrue Mion, PLLC

(57) ABSTRACT

A communication system includes a plurality of nodes including a base station; at least one terminal; and at least one relay node through which each terminal can be connected to the base station. An entity in a network higher in layer than each relay node configures the relay node to set a target value for a predetermined parameter reflecting a radio link status of the relay node. The relay node monitors the predetermined parameter to notify an upper-layer node of difference information corresponding to a difference between the target value and a monitored parameter value. The upper-layer node controls a link parameter of a radio link connecting the upper-layer node and the relay node depending on the difference information, resulting in efficient radio resource allocation in a relay network with small signaling overhead.

36 Claims, 21 Drawing Sheets

(56) References Cited

OTHER PUBLICATIONS

Nokia Siemens Networks, et al., "DL Flow control over Un interface for relaying system", 3GPP Draft, Jan. 2010, R2-100296, Valencia, Spain.

LG Electronics Inc, "DL FLow Control in Un interface", 3GPP Draft, Oct. 12, 2009, R2-095528, France.

Kai-Wen Cheng, et al., "Dynamic Pre-Allocation HARQ (DP-HARQ)in IEEE 802.16j Mobile Multihop Relay (MMR)", ICC '09 IEEE International Conference, Jun. 14, 2009, pp. 1-6, XP031505932, Piscataway, NJ.

\* cited by examiner

FIRST EXEMPLARY EMBODIMENT

EXAMPLE OF FIRST EXEMPLARY EMBODIMENT

SECOND EXEMPLARY EMBODIMENT

FORTH EXEMPLARY EMBODIMENT

RADIO COMMUNICATION SYSTEM AND CONTROL METHOD OF RADIO RESOURCE ALLOCATION

CROSS REFERENCE TO RELATED APPLICATIONS

This application is a National Stage of International Application No. PCT/JP2010/004047 filed Jun. 17, 2010 the contents of which are incorporated herein by reference in their entirety.

TECHNICAL FIELD

The present invention relates to a radio communication system employing relay nodes, and more particularly to a technique of controlling radio resource allocation in the radio communication system.

BACKGROUND ART

3GPP (3rd Generation Partnership Project) LTE-Advanced (Long Term Evolution Advanced) Study Item considers deploying relay node (hereafter referred to as RN) in a cellular network. One of the main objectives for deploying RNs is to enhance coverage area of a base station by improving throughput of a mobile station (user terminal) that locates in a coverage hole or far from the base station resulting in low signal quality. Hereafter, a base station is referred to as BS or eNB (evolved Node B) and a mobile station or user terminal is referred to as UE (user equipment).

In the radio communication network with relay nodes, an eNB that can provide connection to at least one RN is called Donor eNB, which is hereafter called DeNB. In this specification, in order to distinguish a normal eNB from DeNB, the term DeNB is only used when refers to the eNB that is currently having connection with the RN.

Moreover, in this specification, the term "eNB-UE" is used for referring to UE that establishes a connection with DeNB and the term "RN-UE" is used for referring to UE that establishes a connection with RN. On the other hand, the term "UE" is used when refers to both eNB-UE and RN-UE commonly.

The radio interface that provides radio protocol Layer-1 (Physical Layer) to Layer-3 (RRC (Radio Resource Control) Layer) connection between the DeNB and the RN is referred to as backhaul link or Un interface in this specification. On the other hand, the radio interface that provide radio protocol Layer-1 to Layer-3 connection between DeNB and eNB-UE is referred to as eNB-access link and the radio interface that provide radio protocol Layer-1 to Layer-3 connection between RN and RN-UE is referred to as RN-access link or Uu interface. Currently, 3GPP RAN Working Groups (RAN WGs) are mainly considering a relay system called Type 1 Relay that shares radio resources between the backhaul and eNB-access links (see NPL 1 and NPL 2). There have been proposed several methods for scheduling radio resources in such a relay system. Conventional examples are as follows.

PTL 1 discloses a radio cellular network in which a BS (corresponding to DeNB) receives reports of link qualities of BS-SS (corresponding to eNB-access link) and BS-RS (corresponding to backhaul link) from the eNB-UE and the RN, respectively. Based on these link qualities, the DeNB allocates radio resources to the eNB-UE and the RN.

PTL 2 discloses a radio telecommunication system in which a RN performs periodically a local fair scheduling procedure in order to achieve a fair distribution of available radio resources of the RN, which is represented by a local fairness parameter, and transmits the local fairness parameter to a DeNB. Using the local fairness parameter received from the RN, the DeNB performs a global fair scheduling procedure for determining a fair distribution of available radio resources of the DeNB.

{NPL 1} 3GPP TR 36.912 v9.1.0 (2009-12), "Feasibility study for Further Advancements for E-UTRA (LTE-Advanced)"
{NPL 2} 3GPP TR 36.814 v9.0.0 (2010-03), "Further Advancements for E-UTRA physical layer aspects"
{PTL 1} WO2008/127814A1
{PTL 2} EP2066084A1

SUMMARY

Technical Problem

In the radio cellular network disclosed in PTL 1, for example, the DeNB receives reports of channel qualities of the eNB-access link and the backhaul link from the eNB-UE and the RN, respectively. Based on these channel qualities and priorities of data to be transmitted to the eNB-UE and the RN, the DeNB creates parameters representing priorities for allocating the radio resources to the eNB-UE and the RN (hereafter, such parameters are referred to as scheduling metrics of eNB-UE and RN, respectively). Then, the DeNB allocates the radio resources based on the created scheduling metrics. On the other hand, the RN receives a report of channel qualities of the RN-access link from the RN-UE. Then, similar to the scheduling process at the DeNB, the RN creates parameters representing priorities for allocating the radio resources to the RN-UE (scheduling metrics of RN-UE) based on the reported channel qualities and priorities of data to be transmitted to the RN-UE. After that, the RN allocates the radio resources to the RN-UE based on the created scheduling metrics. Accordingly, control of backhaul resource allocation is performed by considering the backhaul link (DeNB-RN) and the RN-access link (RN-UE) independently. It is the same with the system disclosed in PTL 2 because the DeNB performs the global fair scheduling based on the local fairness parameter obtained by the local fair scheduling. Due to this, the control of backhaul resource allocation cannot always produce desirable result. For example, when the RN-access link has much lower channel quality than the backhaul link, the DeNB continues transmitting data to the RN while the RN rarely transmits data to the RN-UE, causing the amount of buffered data at the RN to increase, which may result in data overflow.

As described above, the backhaul resource allocation by independently monitoring the backhaul link and the RN-access link causes not only inefficient resource allocation to the RN but also inefficient resource allocation to eNB-UE because radio resource is shared with all links.

In the above-mentioned relay system, however, throughput in RN-access link is dependent on throughput in backhaul link because the amount of data that the RN can transmit over the RN-access link is dependent on the amount of data received over the backhaul link. Therefore, the backhaul and RN-access links should be considered to be inter-related.

Accordingly, the present invention has been accomplished in consideration of the above mentioned problems, and an object thereof is to provide a radio communication system and a control method of radio resource allocation that can achieve efficient radio resource allocation in a relay network.

Solution to Problem

According to an aspect of the present invention, a communication system comprising a plurality of nodes including a base station; at least one terminal; and at least one relay node through which each terminal can be connected to the base station, wherein an entity in a network higher in layer than each relay node configures the relay node to set a target value for a predetermined parameter reflecting a radio link status of the relay node; the relay node monitors the predetermined parameter to notify the upper-layer node of difference information corresponding to a difference between the target value and a monitored parameter value, and the upper-layer node controls a link parameter of a radio link connecting to the upper-layer node and the relay node depending on the difference information.

According to another aspect of the present invention, a resource allocation control method in a communication system comprising a plurality of nodes including a base station; at least one terminal; and at least one relay node through which each terminal connects to the base station, the method comprising: at an entity in a network higher in layer than each relay node, configuring the relay node to set a target value for a predetermined parameter reflecting a radio link status of the relay node, at the relay node, monitoring the predetermined parameter to notify the upper-layer node of difference information corresponding to a difference between the target value and a monitored parameter value, and at the upper-layer node, controlling a link parameter of a radio link to the relay node depending on the difference information.

Advantageous Effects of Invention

As described above, according to the present invention, it is possible to achieve efficient radio resource allocation in a relay network.

DETAILED DESCRIPTION OF PREFERRED EMBODIMENTS

The preferred embodiments of the present invention will be explained by making references to the accompanied drawings.

1. System

Figure 1:
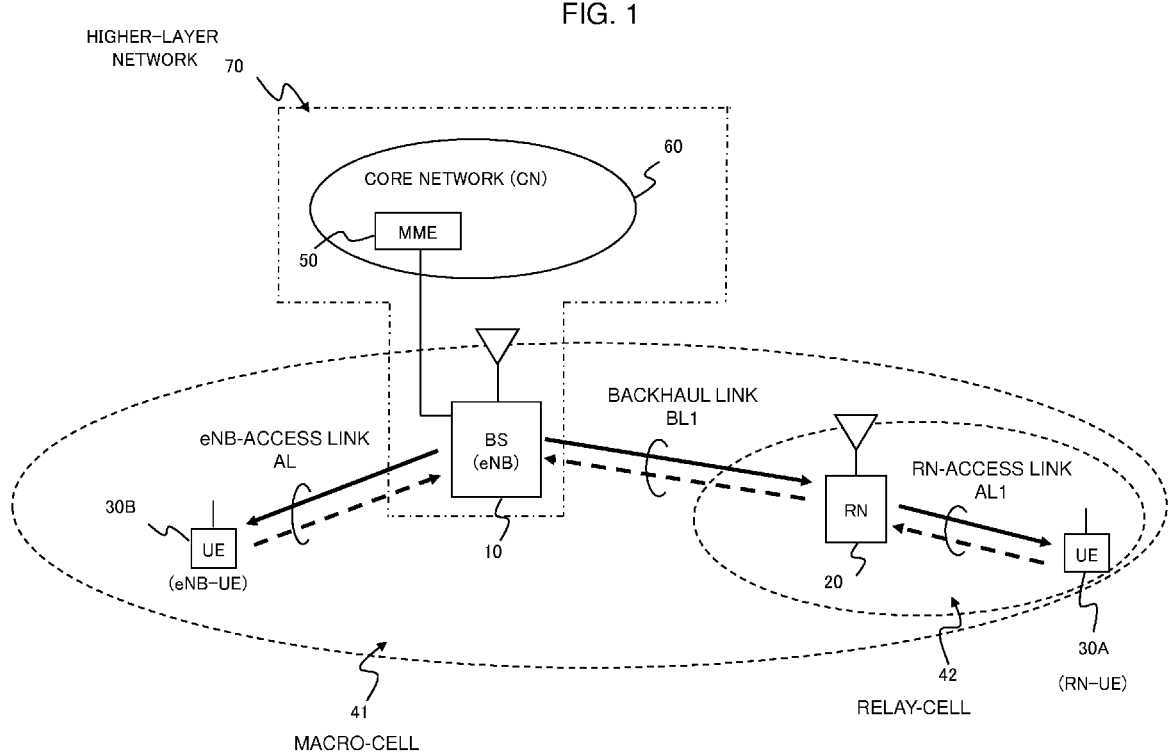
FIG. 1 is a schematic diagram showing a radio communication system which is used in common for exemplary embodiments of the present invention.

As shown in FIG. 1, It is assumed for simplicity that a radio communication system is comprised of a plurality of nodes which include a base station 10, a relay node 20, and user equipments 30 including user equipments 30A and 30B, wherein the base station 10 creates a radio access area (here, Macro cell or Donor cell) 41 and the relay node 20 creates a radio access area (or Relay cell) 42. In the following explanation, it is also assumed that a radio communication system is an OFDMA (Orthogonal Frequency Division Multiple Access) radio communication system such as LTE-Advanced.

The base station 10 operates under the control of MME (Mobility Management Entity) 50 and is connecting to a core network (CN) 60. In this system, a higher-layer network 70 which is higher in layer than the relay node 20 is comprised of the base station 10 and the CN 60 including the MME 50. The base station 10 creates the radio access area 41, and provides radio protocol Layer-1 (Physical Layer) to Layer-3 (Radio Resource Control Layer) connections to the user equipment 30B and the relay node 20 through an eNB-access link AL and a backhaul link (or Un link) BL1, respectively. The relay node 20 creates the radio access area 42 and provides radio protocol Layer-1 to Layer-3 connections to the user equipment 30A through a RN-access link (or Uu link) AL1.

Since the relay node 20 is connected to the base station 10 by the backhaul link BL1, the base station 10 and the relay node 20 correspond to the above-mentioned DeNB and RN, respectively, and the user equipments 30A and 30B correspond to RN-UE (or Relay UE) and eNB-UE (or Macro UE), respectively. Hereafter, these abbreviations are used. Although FIG. 1 shows a single eNB-UE 30B and a single RN-UE 30A, both DeNB 10 and RN 20 are capable of providing connections to multiple UEs simultaneously.

Figure 2:
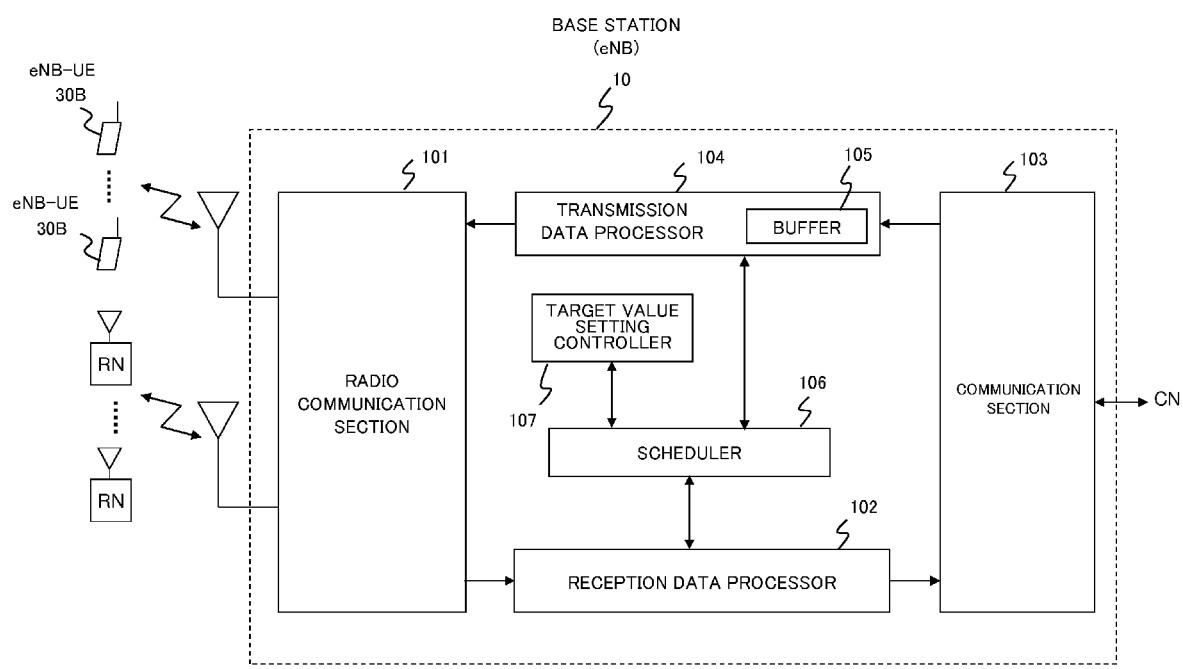
FIG. 2 is a block diagram of an exemplary configuration of a base station which is common for exemplary embodiments of the present invention.

As shown in FIG. 2, the DeNB 10 is provided with a radio communication section 101 which performs radio communications with the eNB-UEs 30B and the RNs 20 through antennas. The radio communication section 101 receives uplink signals from the eNB-UEs 30B and the RNs 20 and outputs the uplink received signals to a reception data processor 102. The reception data processor 102 performs procedures including signal combining, demodulation, and channel decoding to retrieve data from the uplink received signals. The resulting received data are forwarded to the CN 60 through a communication section 103.

A transmission data processor 104 stores data received from the communication section 103 in a buffer 105 before transmitting to the eNB-UEs 30B and the RNs 20. The transmission data processor 104 performs channel encoding, rate matching, and interleaving on the data stored in the buffer 105 in order to create transport channels. Then, the transmission data processor 104 adds control information to the transport channels and creates radio frames. The transmission data processor 104 also performs symbol mapping and creates transmission symbols. The radio communication section 101 modulates and amplifies transmission symbols to create downlink signals and then transmits the downlink signals to the eNB-UEs 30B and the RNs 20 through the antennas.

A scheduler 106 controls radio resource allocation for transmitting data to the eNB-UEs 30B and the RNs 20 by considering scheduling metrics of eNB-UEs and RNs. The scheduling metrics are created by the scheduler 106 based on channel qualities of the eNB-access links AL and the backhaul links BL1, and priorities of data to be transmitted to the eNB-UEs 30B and the RNs 20. In this example, a target value setting controller 107 determines a target value and transmits it to the RN 20 through the transmission data processor 104 and the radio communication section 101. The target value is a parameter that the RN 20 requires in the process of determining difference information, which will be described later. Such a target value setting function may be implemented on one of the radio protocol layers connecting the DeNB 10 with the RN 20 and in an entity on a higher-layer network such as the MME 50.

The RN 20 uses the target value and a monitored parameter to determine the difference information and transmits the difference information over the same radio protocol layer performing the target value setting function to the DeNB 10. The DeNB 10 receives the difference information from the RN 20 through the reception data processor 102. Then, the scheduler 106 of the DeNB 10 changes a link parameter related to the backhaul link (hereafter, referred to as backhaul link parameter) based on the received difference information. Functions of the reception data processor 102, the transmission data processor 104 and the scheduler 106 can be implemented by a program-controlled processor such as a CPU (central processing unit) or a computer running respective programs which are stored in a memory (not shown).

Figure 3:
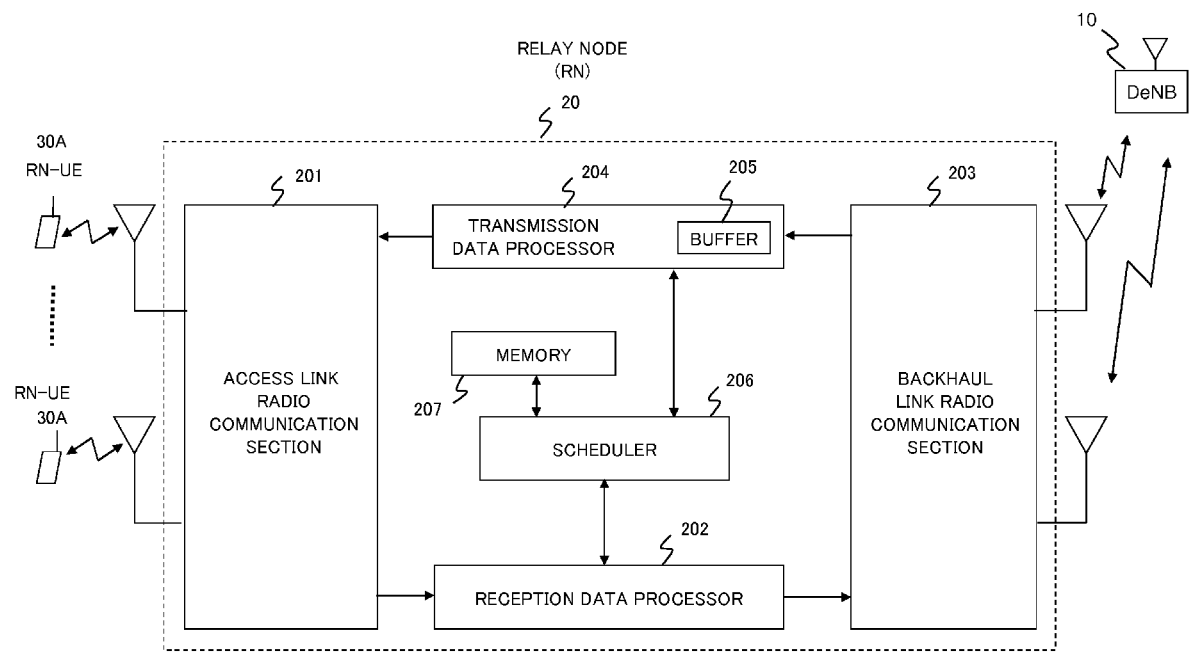
FIG. 3 is a block diagram of an exemplary configuration of a relay node which is common for exemplary embodiments of the present invention.

As shown in FIG. 3, it is assumed that the RN 20 has the same functionalities as the DeNB 10 with some exceptions that will be explained explicitly. An access link radio communication section 201 receives uplink signals from RN-UEs 30A through antennas. A reception data processor 202, similar to the reception data processor 102 of the DeNB 10, forwards the received data to the DeNB 10 through a backhaul link radio communication section 203. A transmission data processor 204 and its buffer 205, similar to the transmission data processor 104 and its buffer 105 of the DeNB 10, creates transmitted symbols based on data destined to the RN-UEs 30A received from the backhaul link radio communication section 203. Then, the access link radio communication section 201 creates downlink signals from the transmitted symbols and transmits them to the RN-UEs 30A.

A scheduler 206 controls radio resource allocation for transmitting data to the RN-UEs 30A by considering scheduling metrics of RN-UEs. The scheduling metrics are created by the scheduler 206 based on channel qualities of the RN-access links AL1, and priorities of data to be transmitted to the RN-UEs 30A. The scheduler 206 also receives the target value from the DeNB 10 over one of the radio protocol layers connecting the DeNB 10 with the RN 20 through the transmission data processor 204 and sets the target value in a memory 207. The memory 207 can be also used to store data other than the target value. Then, the scheduler 206 monitors a predetermined parameter reflecting both statuses of the backhaul and RN-access links and determines difference information based on a difference between the set target value and the monitored parameter. The scheduler 206 transmits the determined difference information to the DeNB 10 over the same radio protocol layer the RN 20 receiving the target value from the DeNB 10 through the reception data processor 202 and the backhaul link radio communication section 203. Functions of the reception data processor 202, the transmission data processor 204 and the scheduler 206 can be implemented by a program-controlled processor such as a CPU (central processing unit) or a computer running respective programs which are stored in a memory (not shown).

Figure 4:
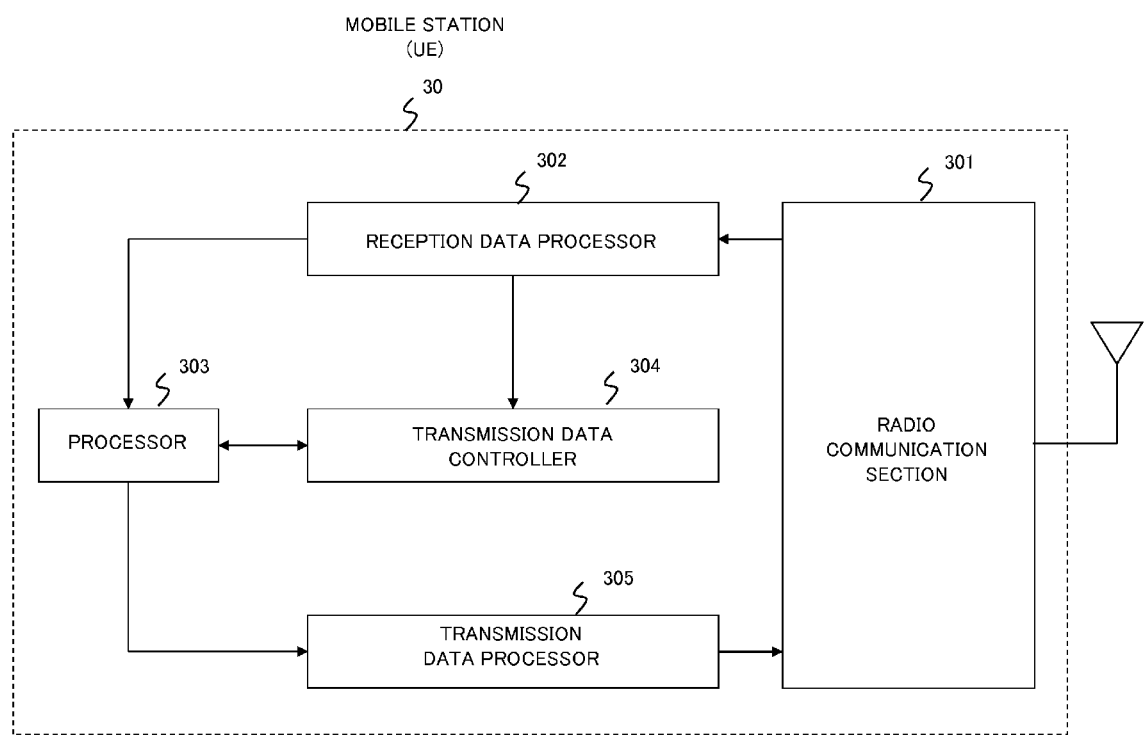
FIG. 4 is a block diagram of an exemplary configuration of a mobile station which is common for exemplary embodiments of the present invention.

FIG. 4 shows an exemplary configuration of the UE 30, which implies both the eNB-UE 30B and RN-UE 30A. A radio communication section 301 receives downlink signals from the eNB/DeNB 10 or the RN 20 through an antenna. A reception data processor 302 performs a process for retrieving data from the received downlink signals and forwards the data to a processor 303 which controls the operations of the UE 30. When data to be transmitted are generated, the processor 303 outputs the transmission data under the control of a transmission data controller 304 to a transmission data processor 305. The radio communication section 301 create uplink signals from the transmission data received from the transmission data processor 305, and transmits them to the DeNB 10 or the RN 20.

2. Data Transmission/Reception Via Relay Node

Figure 5:
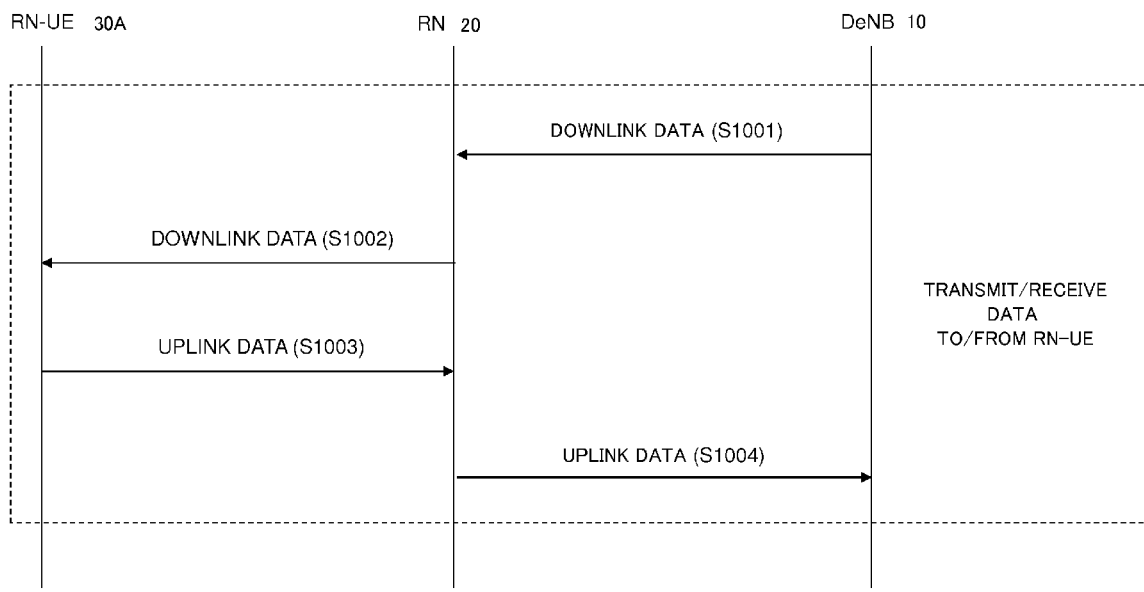
FIG. 5 is a sequence diagram of an exemplary operation of data transmission and reception between DeNB and RN-UE via RN.

As shown in FIG. 5, data communication between RN-UE 30A and DeNB 10 through RN 20 is performed. Step S1001 to S1002 show a sequence of downlink data transmission from the DeNB 10 to the RN-UE 30A. The DeNB 10 first transmits the downlink data to the RN 20 (step S1001). The RN 20 decodes the received downlink data, re-encodes, and forwards them to the RN-UE 30A (step S1002). Step S1003 to S1004 show a sequence of uplink data transmission from the RN-UE 30A to the DeNB 10. The RN-UE 30A first transmits the uplink data to the RN 20 (step S1003). The RN 20 decodes the received uplink data, re-encodes, and forwards them to the DeNB 10 (step S1004).

3. First Exemplary Embodiment 3.1) Outline

Figure 6:
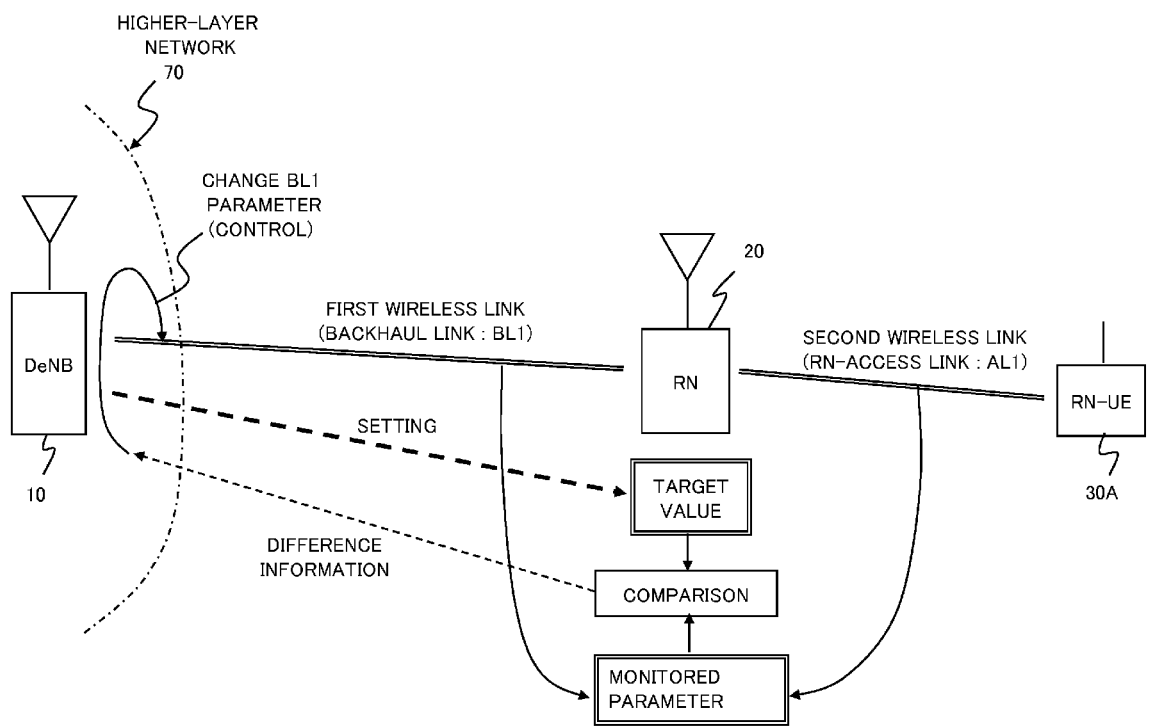
FIG. 6 shows a schematic diagram for explanation of a resource allocation control according to a first exemplary embodiment of the present invention.

Referring to FIG. 6, the higher-layer network 70 including the DeNB 10 configures the RN 20 to set a target value for a predetermined parameter reflecting both statuses of the backhaul link BL1 and the RN-access link AD (SETTING). The predetermined parameter may be the amount of data stored in the RN 20 to be transmitted to the RN-UE 30A, a throughput ratio between the backhaul link BL1 and the RN-access link AL1, a throughput difference between the backhaul link BL1 and the RN-access link AL1, or another parameter related to both the backhaul link BL1 and the RN-access link AL1. The target value is pre-decided as a threshold for desired performance corresponding to QoS (Quality of Service) of UE or a requirement of system operator.

The scheduler 206 of the RN 20 as shown in FIG. 3 monitors the predetermined parameter to obtain a monitored parameter value at preset timing or predetermined intervals. The scheduler 206 compares the set target value to the monitored parameter value (COMPARISON) and transmits a comparison result as difference information to the DeNB 10. The difference information may be a more- or less-resource request. Based on the difference information received from the RN 20, the DeNB 10 controls at least one link parameter of the backhaul link BL1 (CONTROL).

For example, when the monitored parameter value is lower than the target value, the RN 20 transmits a more-resource request to the DeNB 10. When receiving the more-resource request, the scheduler 106 of the DeNB 10 increases radio resource allocated to the backhaul link BL1. In the case of a less-resource request, the scheduler 106 decreases radio resource allocated to the backhaul link BL1.

As described above, a higher-layer entity such as the base station DeNB 10 or the MME 50 determines the target value and the RN 20 compares the monitored parameter value to the target value to notify the DeNB 10 of its difference information. Accordingly, the radio resource allocated to the backhaul link BL1 is controlled so as to keep the monitored parameter value around the set target value. Since the monitored parameter reflects both statuses of the backhaul link BL1 and the RN-access link AD and a more- or less-resource request requires a small amount of data, efficient radio resource allocation can be achieved with small signaling overhead.

3.2) Example

Figure 7:
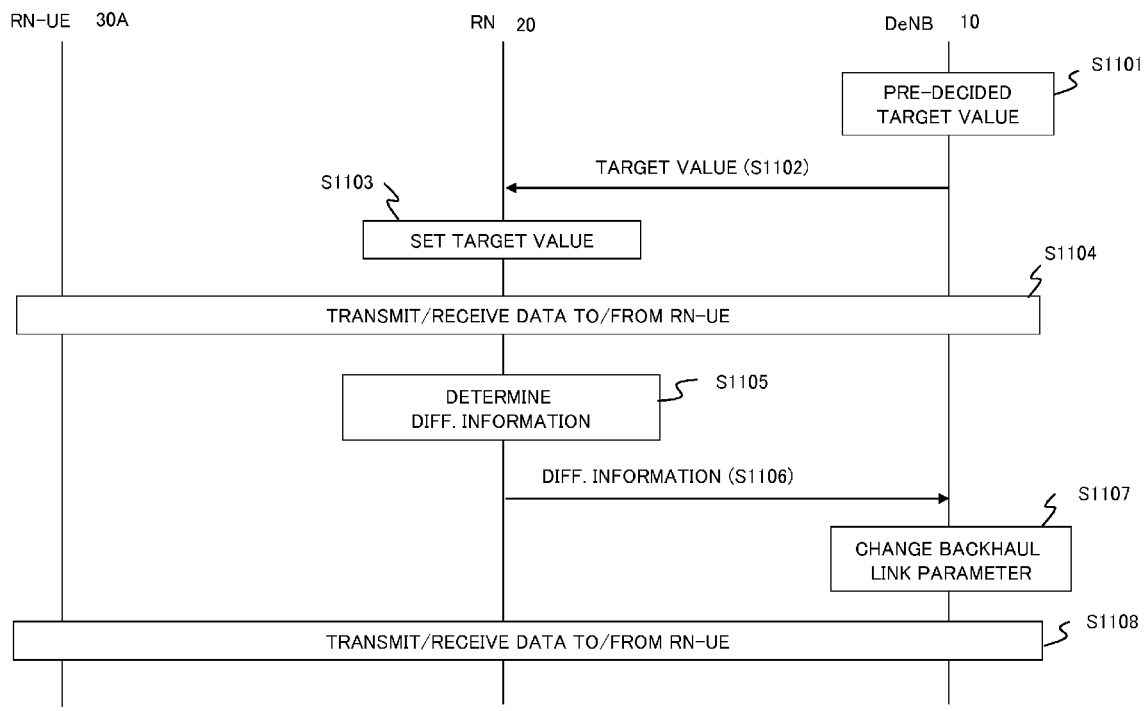
FIG. 7 is a sequence diagram showing a resource allocation control method according to a first exemplary embodiment of the present invention.

Referring to FIG. 7, the DeNB 10 changes the backhaul link parameter based on the difference information provided by the RN 20. First of all, the DeNB 10 decides a target value (step S1101). The target value is pre-decided corresponding to QoS (Quality of Service) of UE or a requirement of system operator.

As previously mentioned, the target value is used together with the monitored parameter related to both the backhaul and RN-access links at the RN 20. Accordingly, the target value and the monitored parameter can be defined in various ways. As a first example, the target value and the monitored parameter can be the amount of data stored in the buffer 205 at the RN 20 for transmitting to the RN-UE 30A over the RN-access link AL1. As a second example, the target value and the monitored parameter can be a ratio between throughput of the RN-access link AD and throughput of the backhaul link BL1. As a third example, the target value and the monitored parameter can be a difference between throughput of the RN-access link AD and throughput of the backhaul link BL1. The throughputs of the RN-access link AD and the backhaul link BL1 can be either per cell, per UE, or per QoS, and they are measured by the RN 20. Also, the RN-UE 30A may measure the throughput of the RN-access link AD and notify the RN 20.

After the target value has been decided, the DeNB 10 transmits the decided target value to the RN 20 (step S1102). The RN 20 receives and sets the target value accordingly (step S1103). Next, the DeNB 10, the RN 20 and the RN-UE 30A participate in the data transmission/reception between the DeNB 10 and the RN-UE 30A (step S1104), which corresponds to the sequence diagram (step S1001 to S1004) of FIG. 5.

At predefined timing, the RN 20 determines difference information based on the difference between the target value and a monitored parameter value (step S1105). The difference information can be determined based on a qualitative difference between the target value and the monitored parameter value. For example, the difference information can be set to one value when the monitored parameter value is less than the target value, and can be set to another value when the opposite. Then, the RN 20 transmits the difference information to the DeNB 10 (step S1106).

At predefined timing in corresponding with the transmission of the difference information by the RN 20, the DeNB 10 receives the difference information and changes a backhaul link parameter accordingly (step S1107). The backhaul link parameter can be defined as in the following examples. As the first example, the backhaul link parameter can be the amount of radio resource allocated to the backhaul link BL1. As the second example, the backhaul link parameter can be the scheduling metric of RN 20 which is a parameter representing priorities for allocating the radio resources to the RN 20. As the third example, the backhaul link parameter can be the rate of data transmission between the DeNB 10 and the RN 20.

Next, based on the changed backhaul link parameter, the DeNB 10, the RN 20, and the RN-UE 30A participate in the data transmission/reception between the DeNB 10 and the RN-UE 30A (step S1108).

Figure 8:
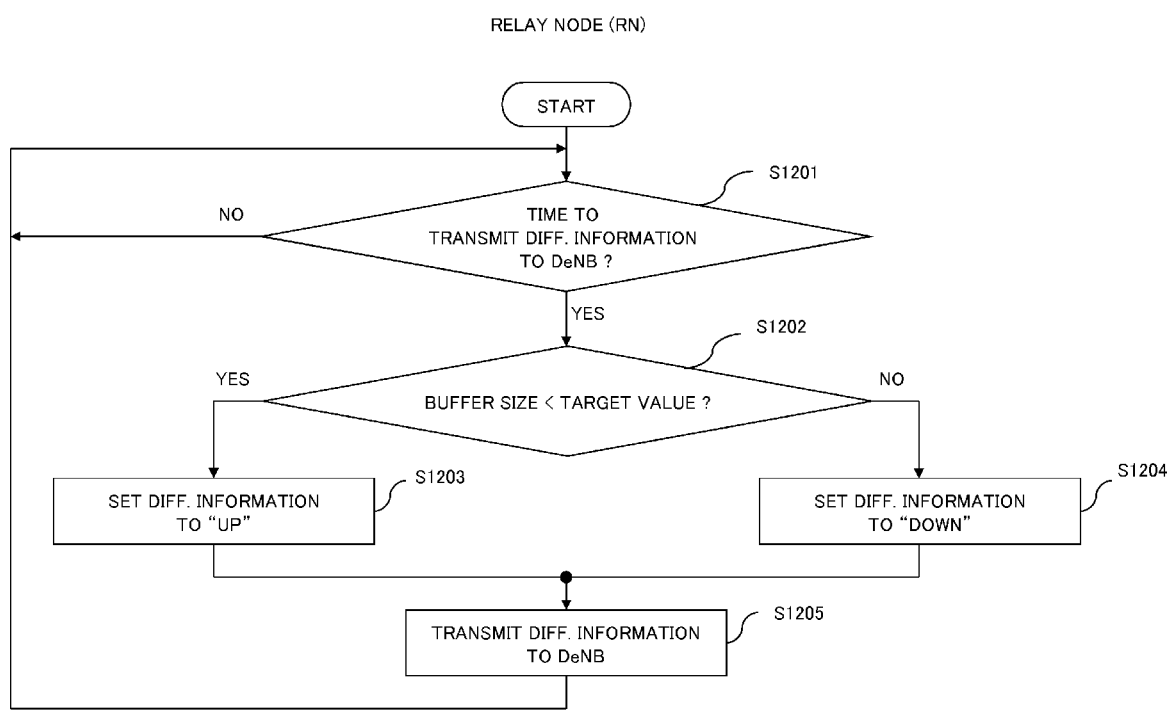
FIG. 8 is a flow chart of an exemplary operation at a relay node according to the first exemplary embodiment.

FIG. 8 shows an exemplary flow chart of steps at the RN 20 for determining and transmitting the DeNB 10 the difference information. In FIG. 8, it is assumed that the scheduler 206 of the RN 20 has already received from the DeNB 10 and set the target value in the memory 207. Moreover, the monitored parameter is assumed to be the amount of data stored in the buffer 205 at the RN 20 for transmitting to the RN-UE over the RN-access link AL1, and it is denoted as buffer size.

Referring to FIG. 8, at step S1201, the scheduler 206 determines whether it is the predefined timing to transmit the difference information to the DeNB 10. If it is not yet the time (No of S1201), the scheduler 206 repeats step S1201. If it is the time (Yes of S1201), the scheduler 206 performs qualitative comparison between the target value and the buffer size (step S1202). If the buffer size is less than the target value (Yes of S1202), the scheduler 206 sets the difference information to "Up" (step S1203). If the buffer size is not less than the target value (No of S1202), the scheduler 206 sets the difference information to "Down" (step S1204). After the difference information has been set (step S1203 or S1204), the scheduler 206 transmits the difference information to the DeNB 10 (step S1205). Then, the process returns to step S1201.

Figure 9:
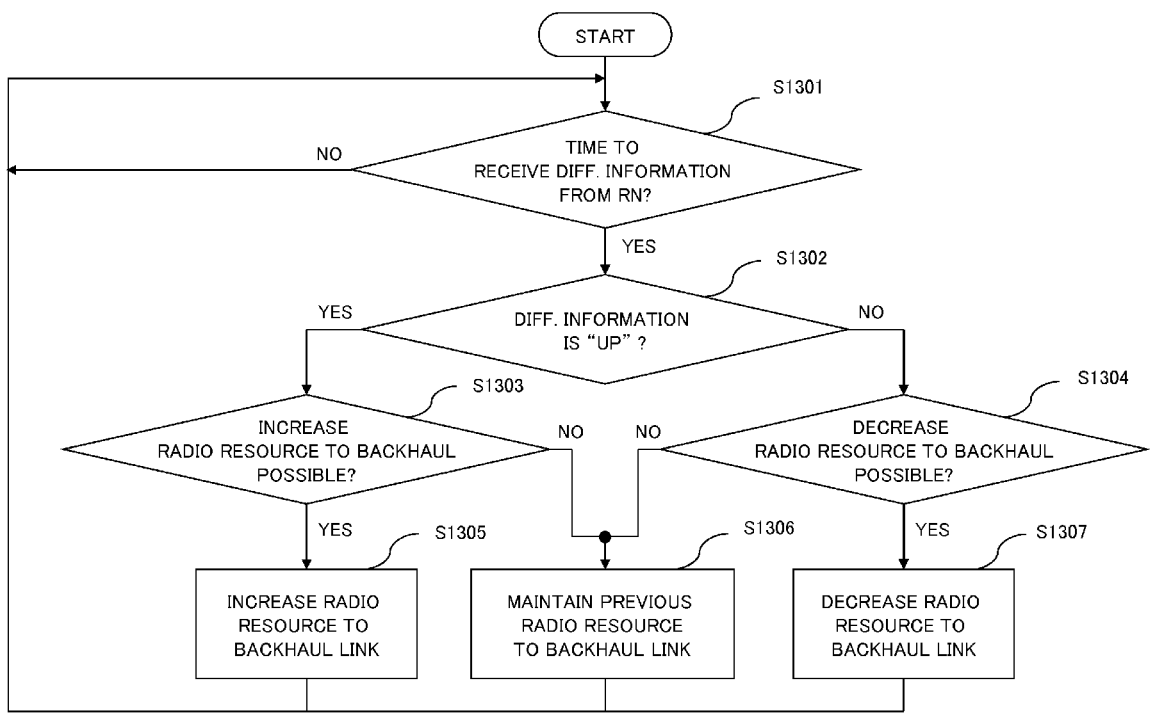
FIG. 9 is a flow chart of an exemplary operation at a donor base station according to the first exemplary embodiment.

FIG. 9 shows an exemplary flow chart of steps at the DeNB for changing backhaul link parameter based on the difference information provided by the RN. Here, the backhaul link parameter is assumed to be the amount of radio resource allocated to the backhaul link BL1.

Referring to FIG. 9, at step S1301, the scheduler 106 determines whether it is the predefined timing to receive the difference information from the RN 20. If it is not yet the time (No of S1301), the scheduler 106 repeats step S1301. If it is the time (Yes of S1301), the scheduler 106 determines whether the difference information received from the RN 20 is Up (step S1302). If the difference information is Up (Yes of S1302), the scheduler 106 determines whether the increase of radio resource to backhaul link BL1 is possible (step S1303).

If the increase is possible (Yes of S1303), the scheduler 106 increases radio resource allocation to the backhaul link BL1 (step S1305). On the other hand, if the difference information is not Up but Down (No of S1302), the scheduler 106 determines whether the decrease of radio resource to backhaul link BL1 is possible (step S1304). If the decrease is possible (Yes of S1304), the scheduler 106 decreases radio resource allocation to the backhaul link BL1 (step S1307). However, if neither the increase nor decrease of radio resource to backhaul is possible (No of S1303 or No of S1304), the scheduler 106 maintains the same amount of radio resource allocation to the backhaul BL1 as the previous timing (step S1306). After the change of radio resource allocation to the backhaul link BL1 (step S1305 or S1306 or S1307), the process returns to step S1301.

The configuration of the target value at the RN 20 by the DeNB 10 in the above example is shown for the purpose of explanation and should not be considered limited to be the only method. As another example, the MME 50 can configure the RN 20 to set the target value.

An exemplary flow chart of steps at the UE for transmitting and receiving data is omitted because it is a general knowledge for those who have skills in the related art.

As described above, making a configuration like the above example enables the DeNB 10 to allocate radio resource to backhaul link BL1 based on the decision of the RN 20 for maintaining the amount of radio resource utilization across the backhaul and RN-access links as defined by the target value. Furthermore, the two-state difference information, Up/Down, more/less resource, or the like, for controlling the radio resource allocation based on the qualitative difference between the target value and the buffer size is expected to be accommodated in the uplink backhaul transmission without requiring large signaling overhead. Therefore, it is possible to achieve efficient radio resource allocation in a relay network with small signaling overhead.

4. Second Exemplary Embodiment

While the first exemplary embodiment shows the case of the DeNB 10 using the pre-decided target value for configuring the RN 20, a second exemplary embodiment shows a case of the DeNB 10 determining the target value based on link information related to the backhaul and RN-access links (backhaul link information and RN-access link information, respectively, in the following). In the following, detailed operations of an example of Embodiment 2 will be explained by employing FIG. 10 and FIG. 11.

Figure 10:
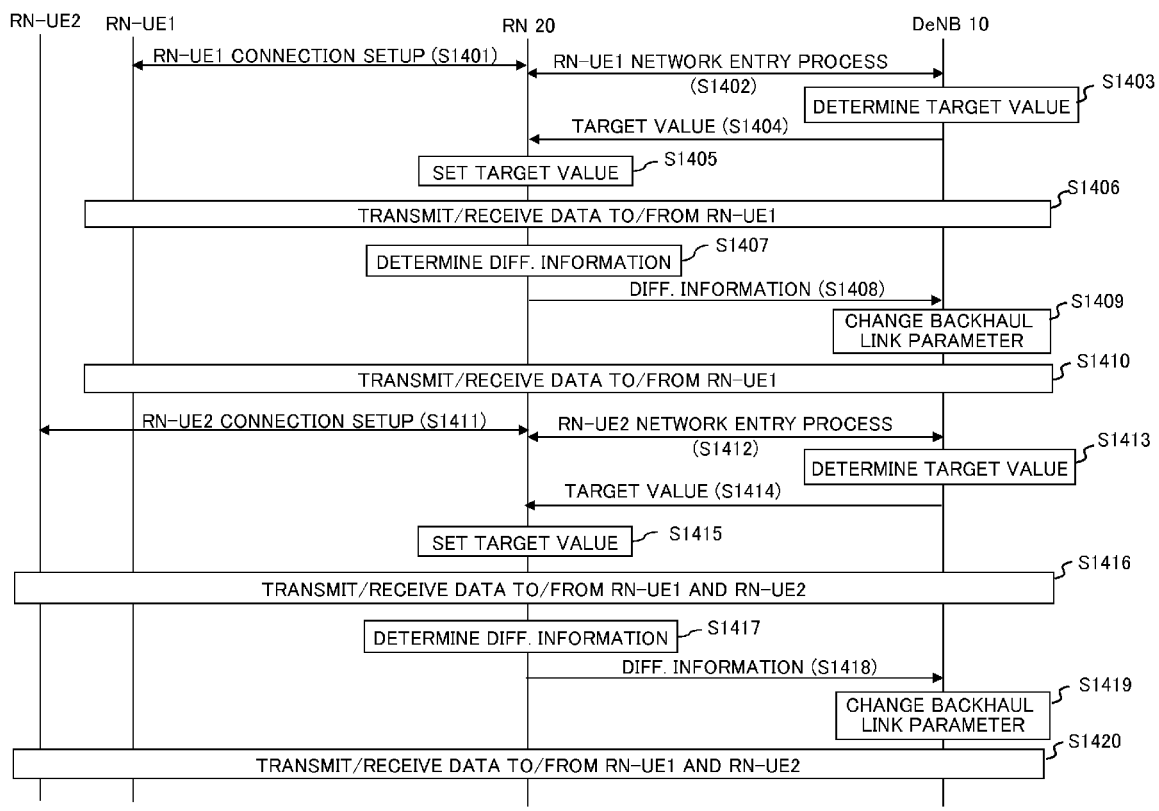
FIG. 10 is a sequence diagram showing a resource allocation control method according to a second exemplary embodiment of the present invention.

FIG. 10 shows an exemplary sequence diagram of the DeNB 10 determining and transmitting the target value to the RN 20 based on the change in the number of RN-UEs, and changing the backhaul link parameter based on the difference information provided by the RN 20. Here, it is assumed that there are two RN-UEs (RN-UE1 and RN-UE2) in the network initially not connecting with the RN 20.

Referring to FIG. 10, step S1401 shows RN-UE1 establishing connection with the RN 20. Then, the RN 20 notifies the DeNB 10 about RN-UE1 entry into the network (step S1402). The DeNB 10 becomes aware of the change in the number of RN-UEs and determine the target value based on the updated number of RN-UEs (step S1403). Then, the DeNB 10 transmits the determined target value to the RN 20 (step S1404). The processes after step S1404, from step S1405 to S1410, are the same as step S1103 to S1108 of FIG. 7 as described above, which show the RN 20 and DeNB 10 participating in controlling the backhaul link parameter for data transmission/reception between DeNB 10 and RN-UE1 based on the determined target value. Therefore, their explanations are omitted.

Next, RN-UE2 establishes connection with the RN 20 (step S1411). The RN 20 notifies the DeNB 10 about RN-UE2 entry into the network (step S1412). Then, the DeNB 10 again determines the target value based on the updated number of RN-UEs (step S1413) and transmits the new target value to the RN 20 (step S1414). After step S1414, from step S1415 to S1420, the RN 20 and DeNB 10 again participate in controlling the backhaul link parameter for data transmission/reception between DeNB 10 and each of RN-UE1 and RN-UE2 based on the new target value. Since step S1415 to S1420 are the same as step S1103 to S1108 of FIG. 7 as described above, their explanations are omitted.

Figure 11:
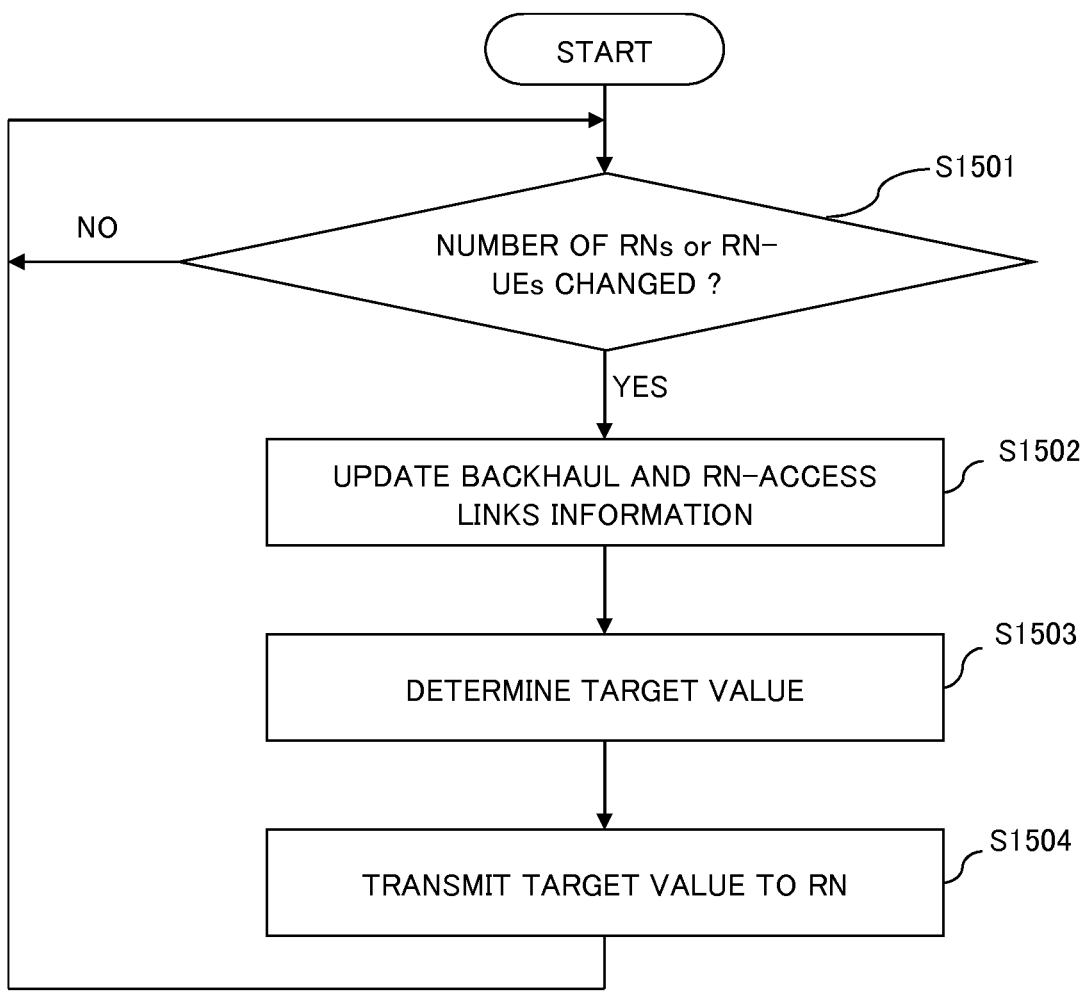
FIG. 11 is a flow chart of an exemplary operation at a donor base station according to the second exemplary embodiment.

FIG. 11 shows an exemplary flow chart of steps at the DeNB for determining the target value. At step S1501, the scheduler 106 determines whether there is change in the number of either RNs or RN-UEs. If there is no change (No of S1501), the scheduler 106 repeats step S1501. If there is change (Yes of S1501), the scheduler 106 updates the backhaul link information and RN-access link information (step S1502). The backhaul link information can be partial or all information related to the number of RNs, the transmission rate over backhaul link BL1, and the amount of available radio resource for backhaul link communication. On the other hand, the RN-access link information can be partial or all information related to the number of RN-UEs, the transmission rate over RN-access link AL1, and the amount of available radio resource for RN-access link communication.

After the backhaul and RN-access links information is updated, the scheduler 106 determines the target value based on that information (step S1503). As one example, if the target value is the amount of data stored at the RN 20 for transmitting to the RN-UE over the RN-access link AD as explained in the first exemplary embodiment, the determination of its value can employ the following equation (1):

$$S(j,k) = R(k) \cdot T(j)/K \qquad (1).$$

Here, $S(j, k)$ is the resulting target value for the j-th RN and the k-th RN-UE from step S1503. $R(k)$ is the average transmission rate of the k-th RN-UE, which can be predefined based on QoS of RN-UE. $T(j)$ is the amount of time-domain radio resource available at the RN-access link of the j-th RN shared by total number of K RN-UEs. $T(j)$ can be predefined based on requirement of system operator.

After the target value has been determined (step S1503), the scheduler 106 transmits the target value to the RN (step S1504). Then, the process returns to step S1501.

The exemplary flow charts of steps at the RN 20 for determining the difference information and steps at the DeNB 10 for changing the backhaul link parameter of the present embodiment are the same as those of the first exemplary embodiment described by FIGS. 8 and 9, respectively. Therefore, their explanations are omitted. Also, the exemplary flow chart of steps at the UE for transmitting and receiving data is also omitted because it is a general knowledge for those who have skills in the related art.

Although the above example of the second exemplary embodiment is shown for determining the target value when there is a new RN-UE entering the network, it is also effective when an RN-UE leaving the network. In specific, when the RN-UE leaving the network, the scheduler 106 updates the RN-access link information to preclude information related to the leaving RN-UE, and determines the target value based on the backhaul link information and the updated RN-access link information. Moreover, the present example is also effective when an RN is entering or leaving the network. In those cases, the scheduler 106 updates the backhaul link information and RN-access link information to include or preclude information related to the entering or leaving RN and its connecting RN-UE, respectively. Then, the scheduler 106 determines the target value based on the updated backhaul link information and RN-access link information.

The triggering of target value determination by the change in the number of RNs or RN-UEs in the above example is shown for the purpose of explanation and should not be considered limited to be the only method. As other examples, the triggering of target value determination can be caused by change in the transmission rate of RN-UE due to change in its QoS, change in available radio resource for backhaul and/or RN-access link communication demanded by the system operator, or it can be done periodically based on predefined timing interval. Also, as an alternative for the DeNB 10 configuring the RN 20 to set the target value, the MME can perform the same operation.

As described above, making a configuration like the present example enables the DeNB 10 to control allocation of radio resource to backhaul link BL1 with respect to the change in either backhaul or RN-access links as reflected by the determined target value. Therefore, it is possible to achieve efficient radio resource allocation in a relay network with changing conditions in backhaul and RN-access links.

5. Third Exemplary Embodiment

While the first exemplary embodiment shows the case of the DeNB 10 using the pre-decided target value for configuring the RN 20, a third exemplary embodiment shows a case of the DeNB 10 modifying the target value based on link information related to throughput of the RN-access link provided by the RN 20 (RN-access link throughput information in the following). In the following, detailed operations of an example of the third exemplary embodiment will be explained by referring to FIGS. 12-14.

Figure 12:
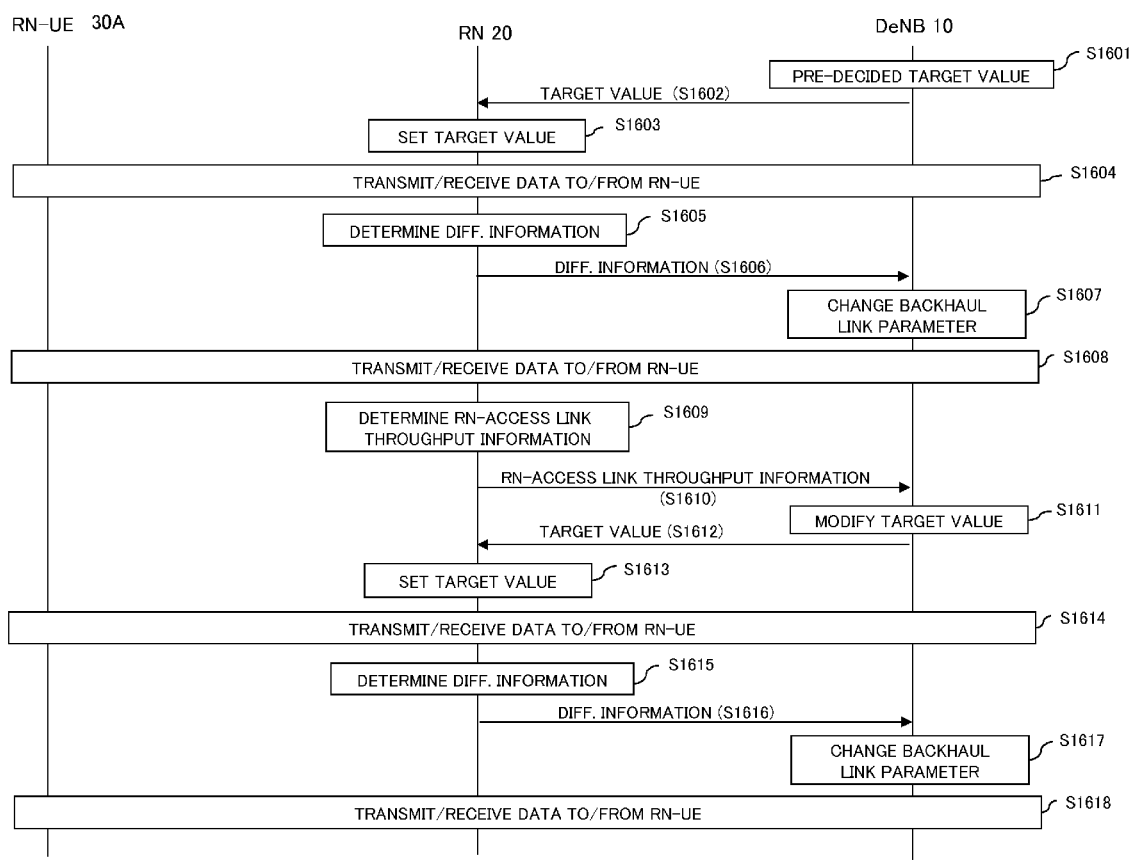
FIG. 12 is a sequence diagram showing a resource allocation control method according to a third exemplary embodiment of the present invention.

FIG. 12 shows an exemplary sequence diagram of the DeNB modifying the pre-decided target value based on the RN-access link throughput information provided by the RN 20, and changing the backhaul link parameter based on the difference information provided by the RN 20.

Referring to FIG. 12, step S1601 to S1608 are the same as step S1101 to S1108 of FIG. 7 as described above, which show the DeNB 10 configuring the RN 20 with the pre-decided target value, and both RN 20 and DeNB 10 participating in controlling the backhaul link parameter for data transmission/reception between DeNB 10 and RN-UE 30A based on that target value. Therefore, their explanations are omitted.

At predefined timing, the RN 20 determines the RN-access link throughput information (step S1609). The RN 20 transmits the determined RN-access link throughput information to the DeNB 10 (step S1610). The DeNB 10 receives the RN-access link throughput information and modifies the target value based on that information (step S1611). After the target value has been modified, the DeNB 10 transmits the target value to the RN 20 (step S1612). After step S1612, from step S1613 to S1618, the RN 20 and DeNB 10 again participate in controlling the backhaul link parameter for data transmission/reception between DeNB 10 and RN-UE 30A based on the modified target value. Since step S1613 to S1618 are the same as step S1103 to S1108 of FIG. 7 described above, their explanations are omitted.

Figure 13:
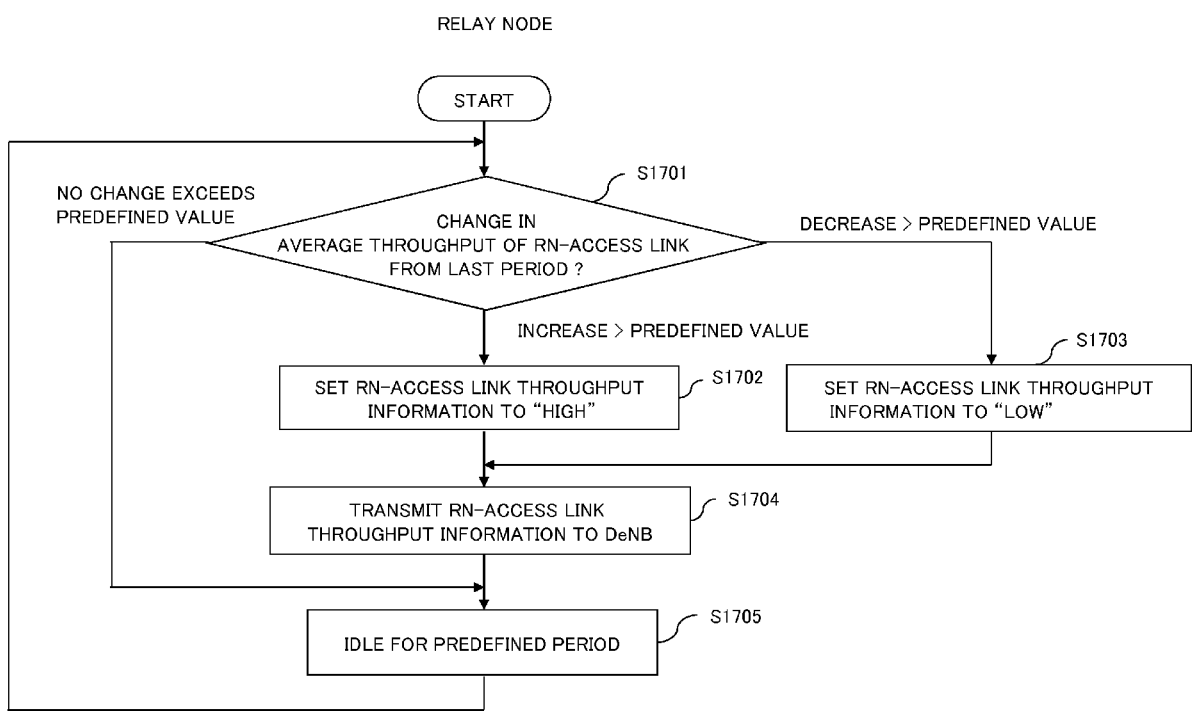
FIG. 13 is a flow chart of an exemplary operation at a relay node according to the third exemplary embodiment.

FIG. 13 shows an exemplary flow chart of steps at the RN 20 for determining the RN-access link throughput information. It is assumed that the flow chart of FIG. 13 is executed periodically based on predefined timing interval, therefore the starting point corresponds to one of the timings for determining the RN-access link throughput information.

At step S1701, the scheduler 206 determines whether there is change in the average throughput of the RN-access link AL1 over the last period. If an increase of the average throughput is more than the predefined value ("Increase>Predefined value" decision of S1701), the scheduler 206 sets the RN-access link throughput information to "High" (step S1702). If a decrease of the average throughput is more than the predefined value ("Decrease>Predefined value" decision of S1701), the scheduler 206 sets the RN-access link throughput information to "Low" (step S1703). After the RN-access link throughput information has been set (step S1702 or S1703), the scheduler 206 transmits that information to the DeNB 10 (step S1704). After that, the process is idle for predefined period (step S1705) before returning to step S1701.

On the other hand, if the change in the average throughput does not exceed the predefined value ("No change exceeds predefined value" decision of S1701), the scheduler 206 neither sets nor transmits the RN-access link throughput information to the DeNB 10, and the process is idle for the predefined period (step S1705) before returning to step S1701. It should be noted that the RN-UE 30A may measure the throughput of the RN-access link AL1 and notify the RN 20.

Figure 14:
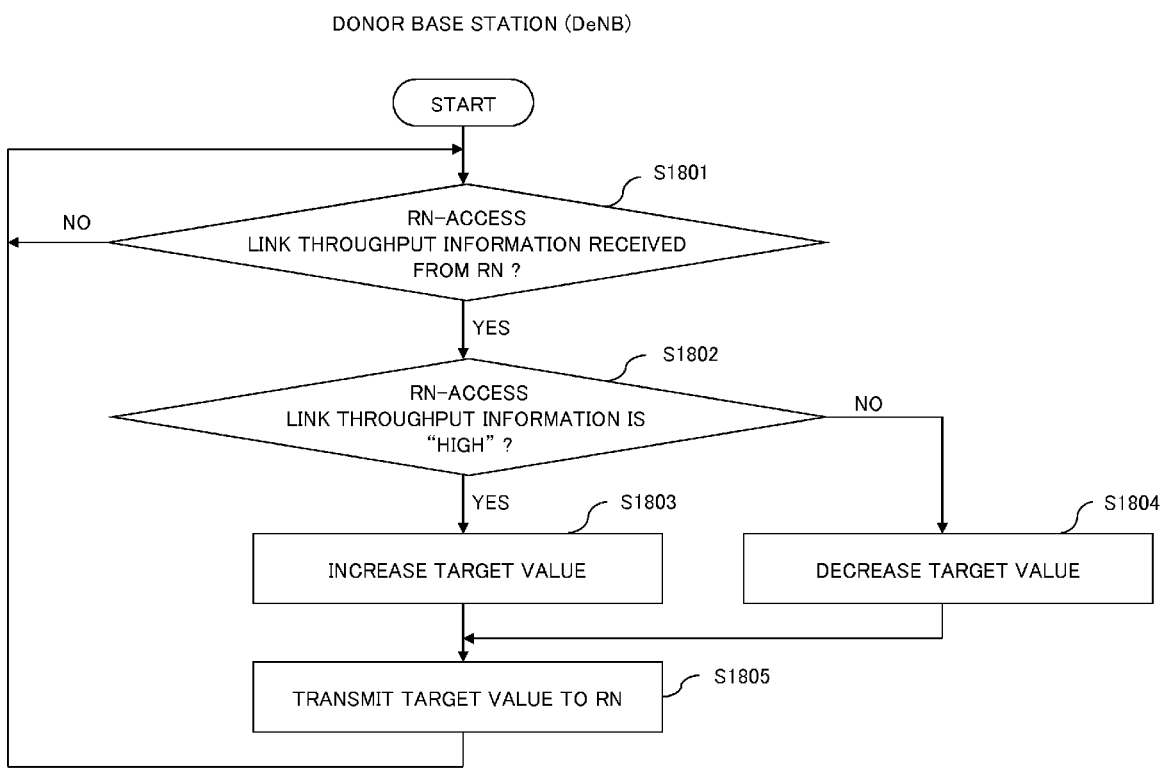
FIG. 14 is a flow chart of an exemplary operation at a donor base station according to the third exemplary embodiment.

FIG. 14 shows an exemplary flow chart of steps at the DeNB for modifying the target value. At step S1801, the scheduler 106 determines whether it has received the RN-access link throughput information from the RN 20. If the RN-access link throughput information is not yet received (No of S1801), the scheduler 106 repeats step S1801. If the RN-access link throughput information has been received (Yes of S1801), the scheduler 106 determines whether the information is High or Low (step S1802). If the received RN-access link throughput information is High (Yes of S1802), the scheduler 106 increases the target value by the predefined amount (step S1803). On the other hand, if the received RN-access link throughput information is Low (No of S1802), the scheduler 106 decreases the target value by the predefined amount (step S1804). After the modification of the target value (step S1803 or S1804), the scheduler 106 transmits the target value to the RN 20 (step S1805). Then, the process returns to step S1801.

The determination of the RN-access link throughput information based on the change in average throughput over the last period in the present example is shown for the purpose of explanation and should not be considered limited to be the only method. As another example, a change in the amount of data stored at the RN 20 for transmitting to the RN-UE 30A over the RN-access link AD over the last period can be used for determining the RN-access link throughput information. Also, as an alternative for the DeNB 10 configuring the RN 20 to set the target value, the MME 50 can perform the same operation.

The exemplary flow charts of steps at the RN 20 for determining the difference information and steps at the DeNB 10 for changing the backhaul link parameter are the same as those of the first exemplary embodiment described by FIGS. 8 and 9, respectively. Therefore, their explanations are omitted. Also, the exemplary flow chart of steps at the UE for transmitting and receiving data is omitted because it is a general knowledge for those who have skills in the related art.

As described above, making a configuration like the present example enables the DeNB 10 to control allocation of radio resource to backhaul link with respect to time-varying channel quality in the RN-access link as reflected by the modified target value. Therefore, it is possible to achieve efficient radio resource allocation in a relay network with time-varying channel conditions in the RN-access link.

6. Fourth Exemplary Embodiment

While the first exemplary embodiment shows the case of the RN 20 always transmitting the difference information to the DeNB 10 at the predefined timing, a fourth exemplary embodiment shows a case of the RN 20 making decision whether to transmit the difference information to the DeNB 10 based on the content of the difference information. In the following, detailed operations of an example of the fourth exemplary embodiment will be explained by employing FIGS. 15 to 17.

Figure 15:
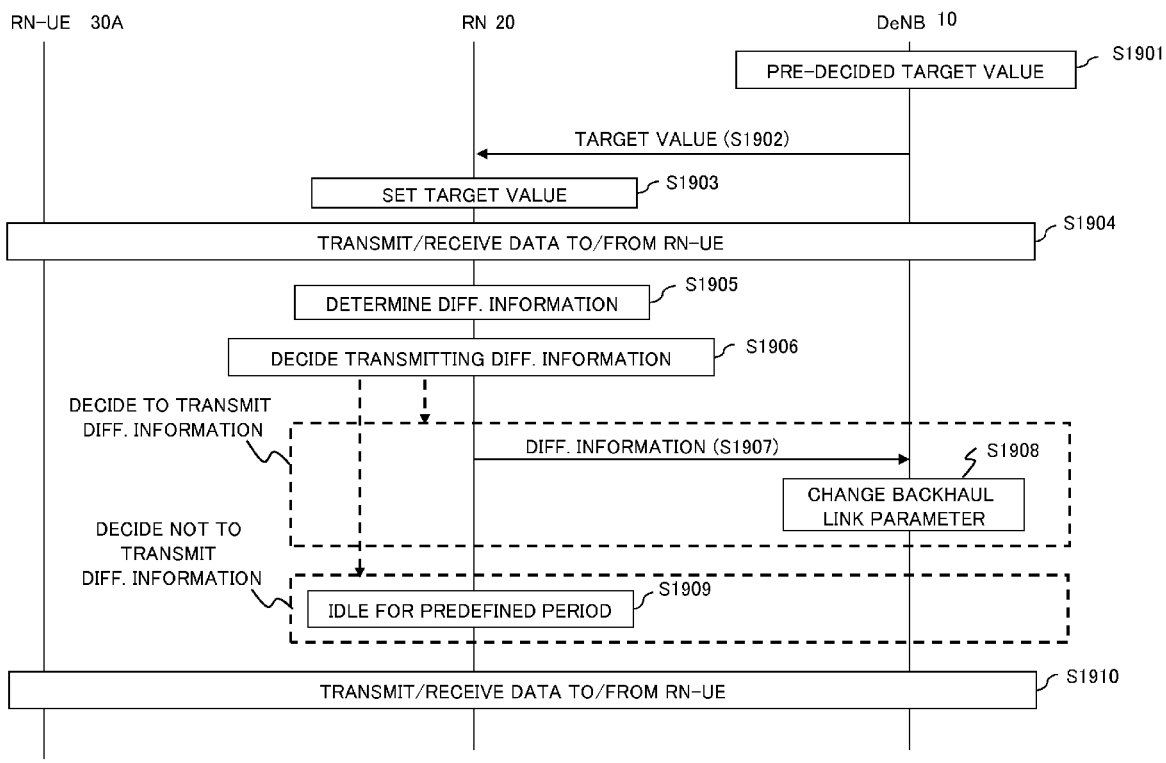
FIG. 15 is a sequence diagram showing a resource allocation control method according to a fourth exemplary embodiment of the present invention.

FIG. 15 shows an exemplary sequence diagram of the DeNB 10 changing the backhaul link parameter based on the reception of the difference information whose transmission is decided by the RN 20. Step S1901 to S1904 are the same as step S1101 to S1104 of FIG. 7 as described above, which show the DeNB 10 configuring the RN 20 with the pre-decided target value, and the DeNB 10, the RN 20, and the RN-UE 30A participating in the data transmission/reception between DeNB 10 and RN-UE 30A. Therefore, their explanations are omitted.

At predefined timing, the RN 20 determines the difference information related to a difference between the target value and the monitored parameter value (step S1905). Then, the RN 20 decides whether to transmit the difference information to the DeNB 10 based on the content of the difference information (step S1906). If the RN 20 decides that the difference information is to be transmitted, the RN 20 transmits the difference information to the DeNB 10 (step S1907). Then, the DeNB 10 changes the backhaul link parameter based on the received difference information (step S1908). On the other hand, if the RN 20 decides that the difference information is not to be transmitted, the RN 20 does not transmit the difference information to the DeNB 10 and the operation at the RN 20 is idle for a predefined period corresponding with the DeNB 10 does not change the backhaul link parameter (step S1909). Then, based on the configuration of the backhaul link parameter (step S1908 or S1909), the DeNB 10, the RN 20, and the RN-UE 30A participate in the data transmission/reception between DeNB 10 and RN-UE 30A (step S1910).

Figure 16:
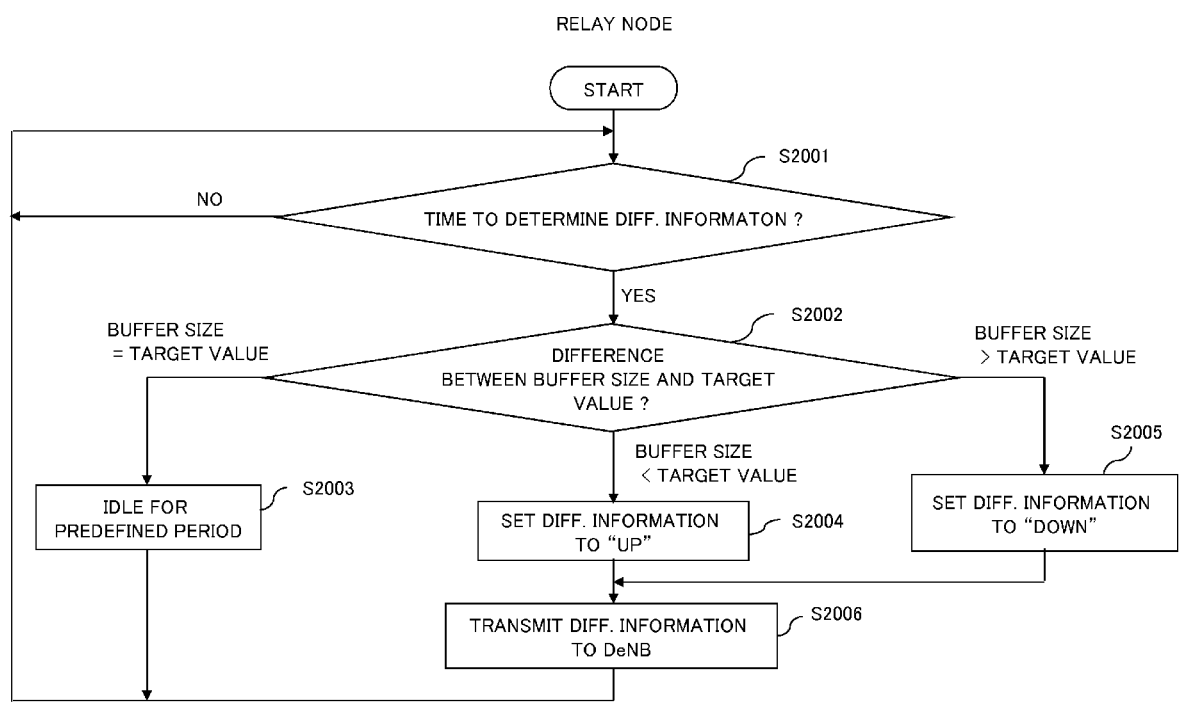
FIG. 16 is a flow chart of an exemplary operation at a relay node according to the fourth exemplary embodiment.

FIG. 16 shows an exemplary flow chart of steps at the RN 20 for determining the difference information and making decision to transmit that information. Here, it is assumed that the scheduler 206 of the RN 20 has already received the target value from the DeNB 10 and stored it in the memory 207. Moreover, the monitored parameter is assumed to be the amount of data stored in the buffer 205 at the RN 20 for transmitting to the RN-UE 30A over the RN-access link AL1, and it is denoted as buffer size.

Referring to FIG. 16, at step S2001, the scheduler 206 determines whether it is the predefined timing to determine the difference information. If it is not yet the time (No of S2001), the scheduler 206 repeats the step S2001. If it is the time (Yes of S2001), the scheduler 206 determines the difference between the buffer size and the target value (step S2002). If the buffer size is less than the target value ("Buffer size<Target value" decision of S2002), the scheduler 206 sets the difference information to "Up" (step S2004). If the buffer size is greater than the target value ("Buffer size>Target value" decision of S2002), the scheduler 206 sets the difference information to "Down" (step S2005). After the difference information has been set (step S2004 or S2005), the scheduler 206 transmits the difference information to the DeNB 10 (step S2006) and the process returns to step S2001.

On the other hand, if the buffer size is substantially equal to the target value ("Buffer size=Target value" decision of S2002), the scheduler 206 performs neither setting the difference information nor transmitting the difference information to the DeNB 10 and the process is idle for a predefined period (step S2003). After that, the process returns to step S2001. At step S2002, "Buffer size=Target value" preferably means that|Buffer size−Target value| is smaller than a predetermined value which may be an allowance for fluctuation or may be previously set by the system operator. In this case, "Buffer size<Target value" means that the buffer size is less than the target value by the predetermined value or more and "Buffer size>Target value" means that the buffer size is greater than the target value by the predetermined value or more.

Figure 17:
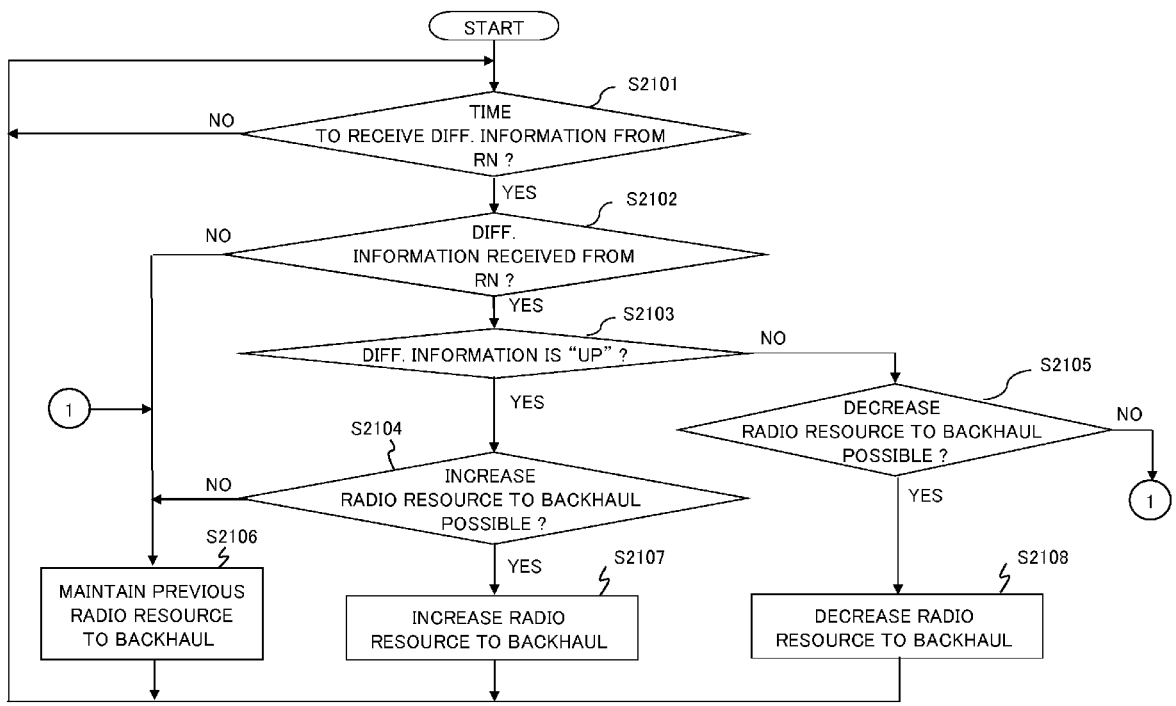
FIG. 17 is a flow chart of an exemplary operation at a donor base station according to the fourth exemplary embodiment.

FIG. 17 shows an exemplary flow chart of steps at the DeNB for changing the backhaul link parameter. In FIG. 17, the backhaul link parameter is assumed to be the amount of radio resource allocated to the backhaul link BL1. At step S2101, the scheduler 106 determines whether it is the predefined timing to receive the difference information from the RN 20. If it is not yet the time (No of S2101), the scheduler 106 repeats step S2101. If it is the time (Yes of S2101), the scheduler 106 determines whether it has received the difference information from the RN 20 (step S2102). If the scheduler 106 has not yet received the difference information (No of S2102), the scheduler 106 maintains the same amount of radio resource allocation to the backhaul as the previous timing (step S2106).

On the other hand, if the scheduler 106 has received the difference information (Yes of S2102), the scheduler 106 determines what difference information it has received (step S2103). If the received difference information is "Up" (Yes of S2103), the scheduler 106 determines whether the increase of radio resource to backhaul link BL1 is possible (step S2104). If the increase is possible (Yes of S2104), the scheduler 106 increases radio resource allocation to the backhaul link BL1 (step S2107). If the difference information is not "Up" (No of S2103), the scheduler 106 determines whether the decrease of radio resource to backhaul link is possible (step S2105). If the decrease is possible (Yes of S2105), the scheduler 106 decreases radio resource allocation to the backhaul link BL1 (step S2108). However, if neither the increase nor decrease of radio resource to backhaul is possible (No of S2104 or No of S2105), the scheduler 106 maintains the same amount of radio resource allocation to the backhaul as the previous timing (step S2106). After the change of radio resource allocation to the backhaul link BL1 (step S2106 or S2107 or S2108), the process returns to step S2101.

The use of three-state qualitative difference for the difference information in the present example is shown for the purpose of explanation and should not be considered limited to be the only method. As another example, the difference information can have more than three states by using an absolute difference between the target value and the monitored parameter value. The absolute difference is obtained by subtracting one from the other and the absolute difference is divided into more than three states. For example, a difference between the target value and the monitored parameter value is quantized into more than three distinct units, each of which is assigned a value to produce the difference information having more than three states. Accordingly, such difference information having more than three states allows the DeNB 10 to control the resource allocation to the backhaul link BL1 more efficiently and finely.

Moreover, although the present example employs the target value configuration method of the first exemplary embodiment, it can also employ the method of the second or third exemplary embodiment. Also, as an alternative for the DeNB configuring the RN to set the target value, the MME can perform the same operation. The exemplary flow chart of steps at the UE for transmitting and receiving data is omitted because it is a general knowledge for those who have skills in the related art.

As described above, making a configuration like the present example enables the RN 20 to omit the transmission of the difference information to the DeNB 10 at some instant. This results in more radio resource available for data transmission in the uplink backhaul transmission from the RN 20 to the DeNB 10 when the difference information needs not to be transmitted. Therefore, it is possible to improve throughput in the uplink transmission in addition to achieving efficient radio resource allocation in a relay network with small signaling overhead.

7. Fifth Exemplary Embodiment

While the above-mentioned exemplary embodiments show the case of the RN-UE communicating with the DeNB through only one RN, a fifth exemplary embodiment of the present invention shows a case of the RN-UE communicating with the DeNB through more than one RNs. In the following, taking as an example the case of two cascaded relay nodes through which the UE communicates with the DeNB, detailed operations of the fifth exemplary embodiment will be explained by employing FIGS. 18 to 21.

Figure 18:
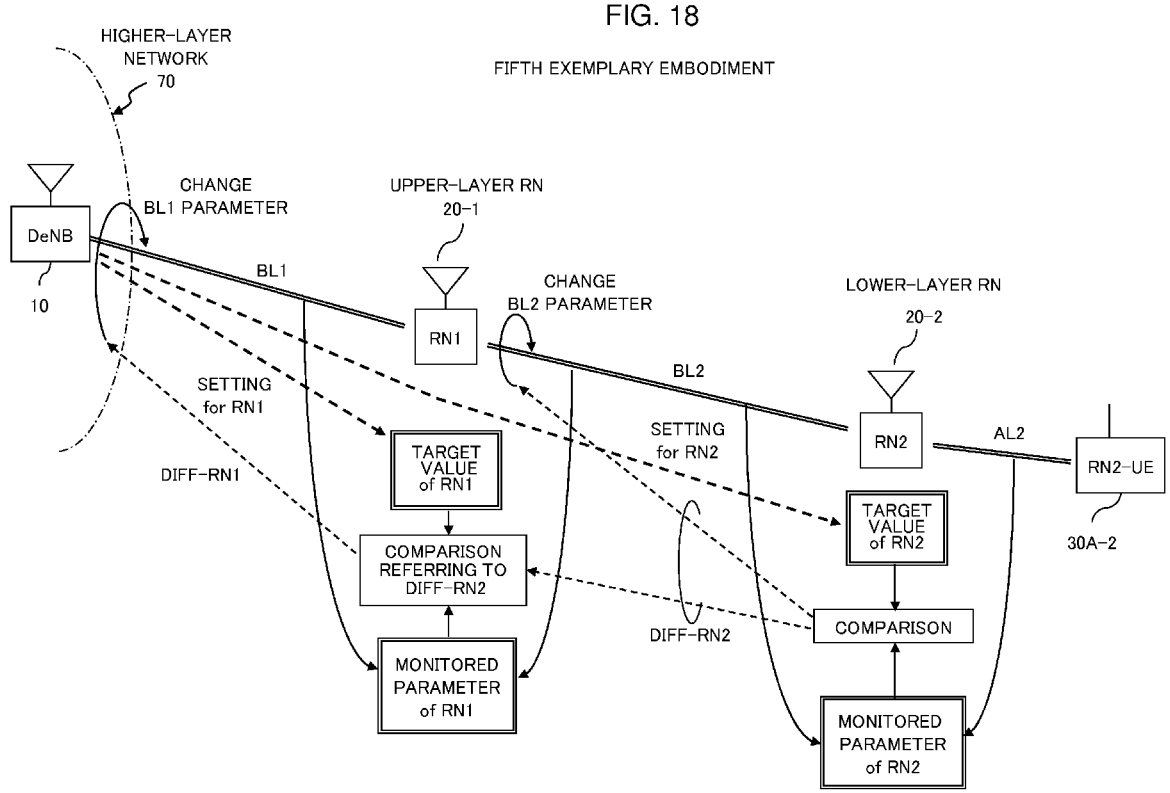
FIG. 18 shows a schematic diagram for explanation of a resource allocation control according to a fifth exemplary embodiment of the present invention.

As shown in FIG. 18, the DeNB 10, which is included in the higher-layer network 70, is connecting with a first RN denoted by a reference numeral 20-1 through a DeNB-RN1 backhaul link BL1. Hereafter, the RN 20-1 is referred to as RN1. The RN1 is connecting to a second RN denoted by a reference numeral 20-2 through a RN1-RN2 backhaul link BL2. Hereafter, the RN 20-2 is referred to as RN2. Note that since the RN1 and the RN2 are connecting hierarchically, they can also be referred to as upper-layer RN and lower-layer RN, respectively. the RN2 provides its UE denoted as RN2-UE 30A-2 access to the upper-layer network entities through an RN2-access link AL2.

The higher-layer network 70 including the DeNB10 configures the RN1 to set a target value of RN1 for a predetermined parameter reflecting both statuses of the backhaul link BL1 and the backhaul link BL2 (SETTING for RN1). The predetermined parameter of RN1 may be the amount of data stored in the RN1 to be transmitted to the RN2, a throughput ratio between the backhaul link BL1 and the backhaul link BL2, or a throughput difference between the backhaul link BL1 and the backhaul link BL2. Also, the higher-layer network 70 configures the RN2 to set a target value of RN2 for a predetermined parameter reflecting both statuses of the backhaul link BL2 and the RN2-access link AL2 (SETTING for RN2). The configuration is relayed from the higher-layer network 70 to the RN2 through the RN1. The predetermined parameter of RN2 may be the amount of data stored in the RN2 to be transmitted to the RN2-UE 30A-2, a throughput ratio between the backhaul link BL2 and the RN2-access link AL2, or a throughput difference between the backhaul link BL2 and the RN2-access link AL2. The target values of RN1 and RN2 are pre-decided as thresholds for desired performance corresponding to QoS of UE or a requirement of system operator.

Since the RN1 and the RN2 has the same functionalities as previously described in FIG. 3, their operations will be described making a distinction between them by attaching the suffix "-1" or "-2" to the reference numerals of FIG. 3. At the RN2, the scheduler 206-2 corresponding to the scheduler 206 in FIG. 3 monitors the predetermined parameter to obtain a monitored parameter value at preset timing or predetermined intervals. The scheduler 206-2 compares the set target value to the monitored parameter value (COMPARISON at RN2) and transmits a comparison result as difference information of RN2 to the RN1. Based on the difference information of RN2, the RN1 controls a link parameter of the backhaul link BL2 (RN1-RN2 backhaul link parameter in the following). The difference information of RN2 and the RN1-RN2 backhaul link parameter may assume any form as disclosed in the previous exemplary embodiments.

At RN1, the scheduler 206-1 corresponding to the scheduler 206 in FIG. 3 monitors the predetermined parameter to obtain a monitored parameter value at preset timing or predetermined interval. The scheduler 206-1 determines difference information of RN1 by considering a comparison result between the set target value and the monitored parameter value, and the previously received difference information of RN2 (COMPARISON at RN1). The RN1 transmits the determined difference information of RN1 to the DeNB 10. Based on the difference information of RN1, the DeNB 10 controls a link parameter of the backhaul link BL1 (DeNB-RN1 backhaul link parameter in the following). The difference information of RN1 and the DeNB-RN1 backhaul link parameter may assume any form as disclosed in the previous exemplary embodiments.

Figure 19:
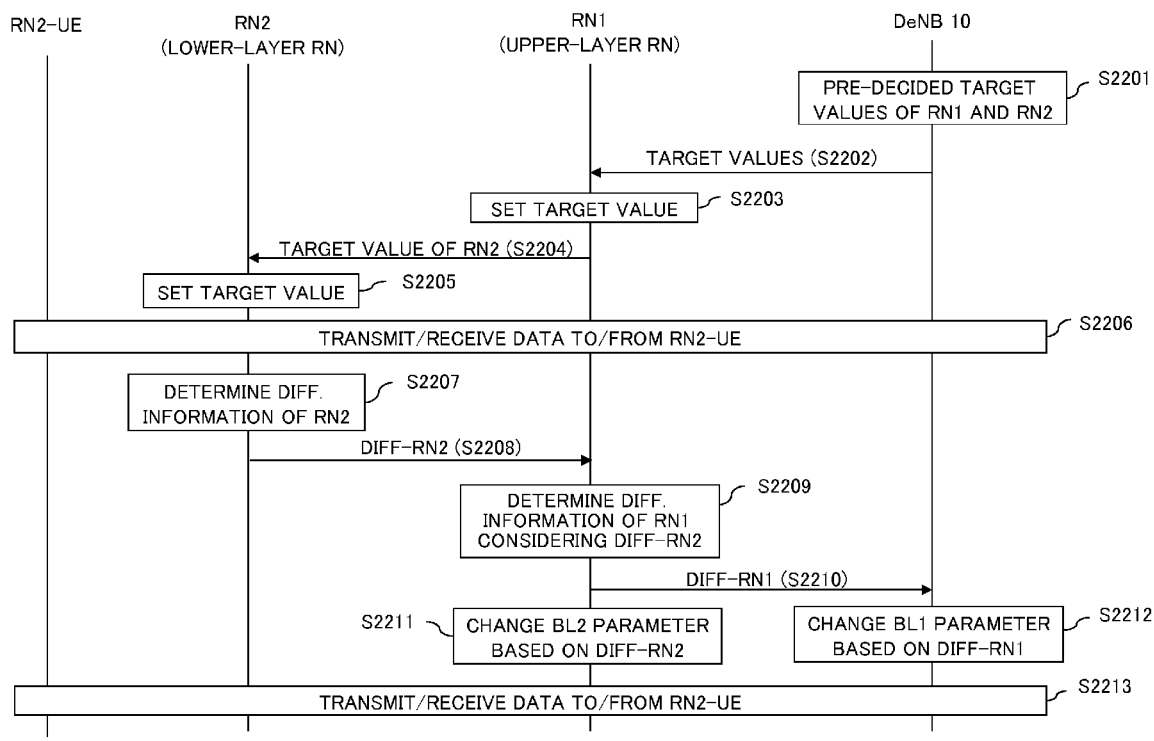
FIG. 19 is a sequence diagram showing a resource allocation control method according to the fifth exemplary embodiment of the present invention.

FIG. 19 shows an exemplary sequence diagram of the resource allocation control according to the fifth exemplary embodiment. First, the DeNB 10 decides target values of RN1 and RN2 (step S2201). After that, the DeNB 10 transmits the RN1 and RN2 target values to the RN1 (step S2202). The RN1 receives and sets the RN1 target value accordingly (step S2203). Then, the RN1 forwards the RN2 target value to the RN2 (step S2204). The RN2 receives and sets the RN2 target value accordingly (step S2205). Next, the DeNB 10, RN1, RN2 and RN2-UE 30A-2 participate in the data transmission/reception between the DeNB 10 and the RN2-UE 30A-2 (step S2206).

At predefined timing for RN2 to transmit the difference information of RN2 to the RN1, the RN2 determines the difference information of RN2 (hereafter, referred to as DIFF-RN2) based on the difference between the set target value and the monitored parameter value (step S2207). Then, the RN2 transmits the difference information DIFF-RN2 to the RN1 (step S2208).

Upon the RN1 receiving the difference information DIFF-RN2 and at predefined timing for RN1 to transmit the difference information of RN1 to the DeNB 10, the RN1 determines the difference information of RN1 (hereafter, referred to as DIFF-RN1) based on the difference between the set target value and the monitored parameter value, and the received difference information DIFF-RN2 (step S2209). Then, the RN1 transmits the difference information DIFF-RN1 to the DeNB 10 (step S2210). Moreover, in addition to the RN1 transmitting the difference information DIFF-RN1 to the DeNB 10, the RN1 changes the RN1-RN2 backhaul link parameter based on the received difference information DIFF-RN2 (step S2211).

Upon the DeNB 10 receiving the difference information DIFF-RN1, the DeNB 10 changes the DeNB-RN1 backhaul link parameter based on the received difference information DIFF-RN1 (step S2212).

Based on the changed RN1-RN2 backhaul link parameter and DeNB-RN1 backhaul link parameter, the DeNB 10, RN1, RN2 and RN2-UE 30A-2 participate in the data transmission/reception between the DeNB 10 and the RN2-UE 30A-2 (step S2213).

In the following, detailed operations at the DeNB 10, RN1, and RN2 will be explained by employing the corresponding flow charts.

As for the RN 2, the DIFF-RN2 determination and transmission operations at the RN2 are similar to the DIFF determination and transmission operations as shown in FIG. 8, provided the RN, the difference information, and the DeNB in FIG. 8 are replaced with RN2, the difference information DIFF-RN2, and the RN1, respectively. Therefore, the explanations regarding the operations of the RN2 are omitted.

Figure 20:
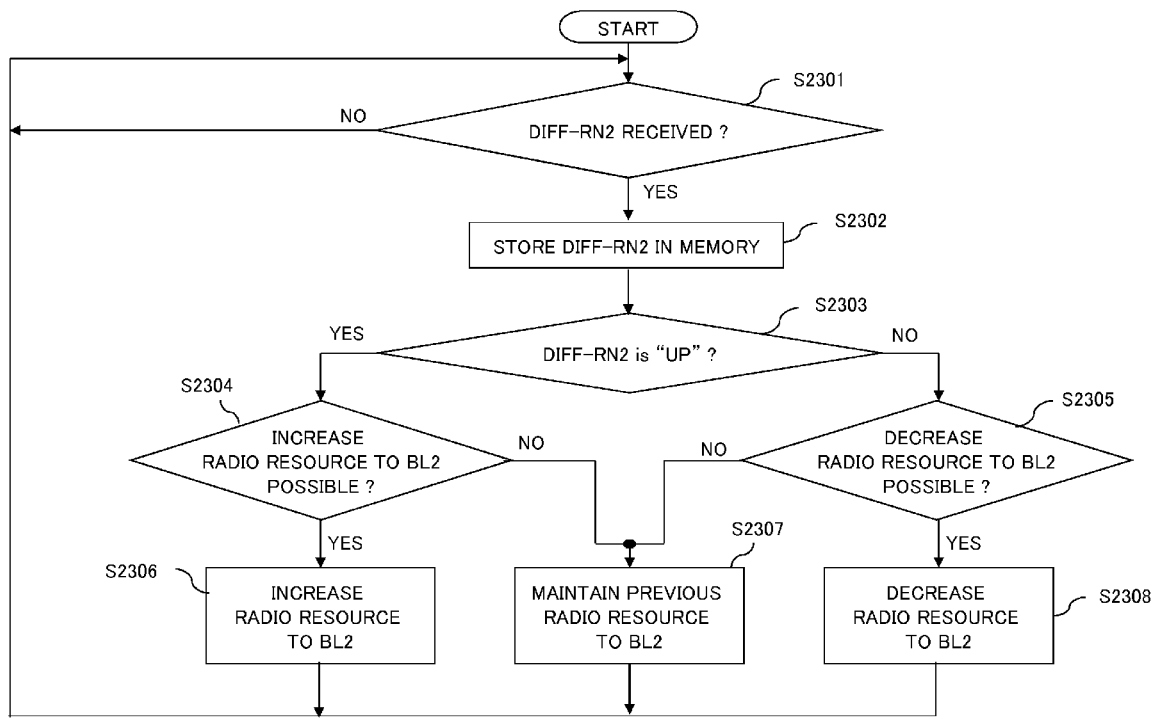
FIG. 20 is a flow chart showing an exemplary operation of changing BL2 parameter at a relay node according to the fifth exemplary embodiment.

FIG. 20 shows an exemplary flow chart of RN1 changing the RN1-RN2 backhaul link parameter based on the received difference information of RN2. Here, it is assumed that the RN1-RN2 backhaul link parameter is the amount of radio resource allocated to the backhaul link BL2. At step S2301, the scheduler 206-1 determines whether it has received the difference information DIFF-RN2 from RN2. If the difference information DIFF-RN2 is not yet received (No of S2301), the scheduler 206-1 repeats step S2301. If the difference information DIFF-RN2 has been received (Yes of S2301), the scheduler 206-1 stores the received difference information DIFF-RN2 in the memory 207-1 (step S2302) and determines whether the received difference information DIFF-RN2 indicates "UP" (step S2303). If the difference information DIFF-RN2 is "UP" (Yes of S2303), the scheduler 206-1 determines whether the increase of radio resource to the backhaul link BL2 is possible (step S2304). If the increase is possible (Yes of S2304), the scheduler 206-1 increases radio resource allocation to the backhaul link BL2 (step S2306). On the other hand, if the difference information DIFF-RN2 is not "UP" but "DOWN" (No of S2303), the scheduler 206-1 determines whether the decrease of radio resource to the backhaul link BL2 is possible (step S2305). If the decrease is possible (Yes of S2305), the scheduler 206-1 decreases radio resource allocation to the backhaul link BL2 (step S2308). However, if neither the increase nor decrease of radio resource to the backhaul link BL2 is possible (No of S2304 or No of S2305), the scheduler 206-1 maintains the same amount of radio resource allocation to the backhaul BL2 as the previous timing (step S2307). After the change of radio resource allocation to the backhaul link BL2 (step S2306 or S2307 or S2308), the process returns to step S2301.

Figure 21:
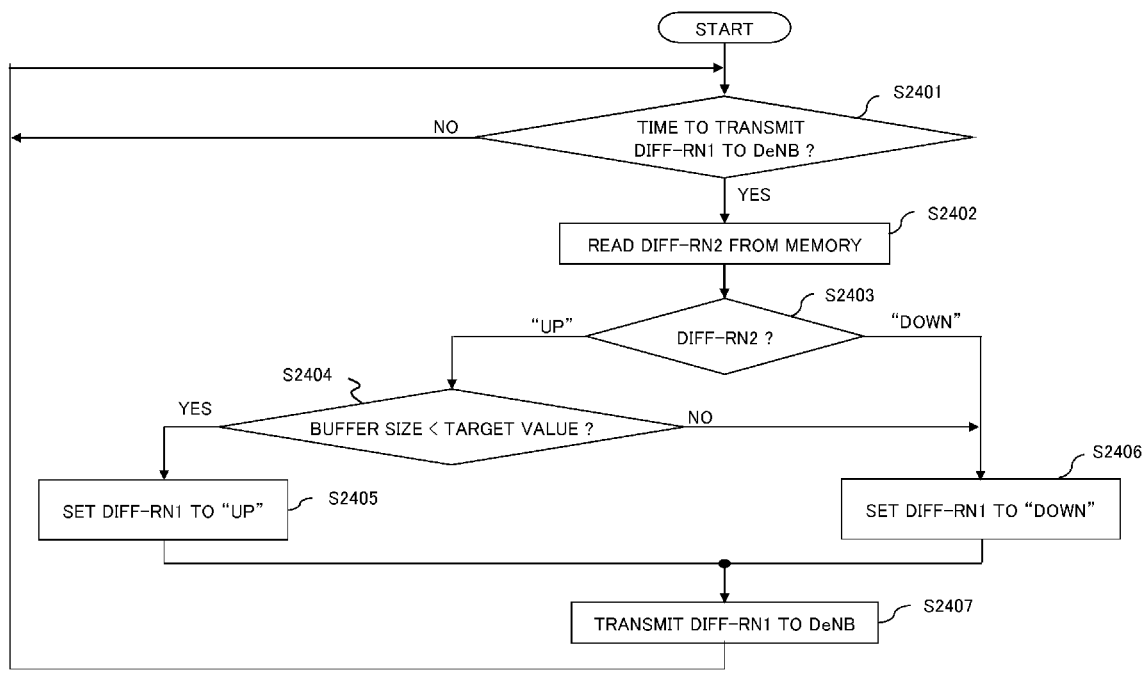
FIG. 21 is a flow chart showing an exemplary operation of determining and transmitting difference information at a relay node according to the fifth exemplary embodiment.

FIG. 21 shows an exemplary flow chart of RN1 determining and transmitting the difference information of RN1 to the DeNB 10. Here, it is assumed that the scheduler 206-1 has already received from the DeNB 10 and set the target value in the memory 207-1. Moreover, the monitored parameter is assumed to be the amount of data stored in RN1 to be transmitted to RN2, and it is denoted as buffer size. At step S2401, the scheduler 206-1 determines whether it is the predefined timing to transmit the difference information DIFF-RN1 to the DeNB 10. If it is not yet the time (No of S2401), the scheduler 206-1 repeats step S2401. If it is the time (Yes of S2401), the scheduler 206-1 first reads the previously received difference information DIFF-RN2 from the memory 207-1 (step S2402) and determines what the previously received difference information DIFF-RN2 is (step S2403). If the previously received difference information DIFF-RN2 is "UP" ("UP" decision in S2403), the scheduler 206-1 performs qualitative comparison between the target value and the buffer size (step S2404). If the buffer size is less than the target value (Yes of S2404), the scheduler 206-1 sets the difference information DIFF-RN1 to "UP" (step S2405). If the buffer size is not less than the target value (No of S2404), the scheduler 206-1 sets the difference information DIFF-RN1 to "DOWN" (step S2406). On the other hand, if the previously received difference information DIFF-RN2 is "DOWN" ("DOWN" decision in S2403), the scheduler 206-1 also sets the difference information DIFF-RN1 to "DOWN" (step S2406). After the difference information DIFF-RN1 has been set (step S2405 or S2406), the scheduler 206-1 transmits the difference information DIFF-RN1 to the DeNB 10 (step S2407). Then, the process returns to step S2401.

The operation at the DeNB 10 that changes the DeNB-RN1 backhaul link parameter based on the received difference information DIFF-RN1 is similar to the operation as shown in FIG. 9, provided the RN, the difference information DIFF, and the backhaul link parameter are replaced with RN1, the difference information DIFF-RN1, and the DeNB-RN1 backhaul link parameter, respectively. Therefore, the explanations regarding this operation are omitted.

The configuration of the target values of RN1 and RN2 by the DeNB 10 in the above example is shown for the purpose of explanation and should not be restricted to the example. As another example, the MME 50 can configure the target values of RN1 and RN2. Also, the upper-layer node can configure the target value of the lower-layer node, for example, RN1 in the above can configure the target value of RN2. Moreover, besides the use of pre-decided target values in the above example, the method for determining and updating the target values disclosed in the second exemplary embodiment is also effective for the fifth exemplary embodiment. For example, the target values of RN1 and RN2 in the above can be determined based on information about number of RNs and UEs, transmission rate, and amount of available radio resource related to the backhaul link BL1, the backhaul link BL2, and the RN2-access link AL2. Also, the method for modifying the target values disclosed in the third exemplary embodiment is effective for the fifth exemplary embodiment. For example, RN2 can provide information related to throughput in the RN2-access link to RN1, and RN1 can either modify the target value of RN2 based on the received information from RN2 directly or RN1 can forward the received information from RN2 to the DeNB 10 to let the DeNB 10 modify the target value of RN2.

An exemplary flow chart of steps at RN2-UE 30A-2 for transmitting and receiving data is omitted because it is a general knowledge for those who have skills in the related art.

As described above, making a configuration like the present example enables additional radio coverage as a result from hierarchically cascading multiple RNs, while maintaining efficient radio resource allocation across all hops.

8. Other Exemplary Embodiment

The present invention is also applicable to E-UTRAN (Evolved Universal Terrestrial Radio Access Network), which includes a plurality of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs.

The eNB hosts the following functions:
Functions for Radio Resource Management: Radio Bearer Control, Radio Admission Control, Connection Mobility Control, Dynamic allocation of resources to UEs in both uplink and downlink (scheduling);

IP header compression and encryption of user data stream;

Selection of an MME at UE attachment when no routing to an MME can be determined from the information provided by the UE;

Routing of User Plane data towards Serving Gateway;

Scheduling and transmission of paging messages (originated from the MME);

Scheduling and transmission of broadcast information (originated from the MME or O&M);

Measurement and measurement reporting configuration for mobility and scheduling;

Scheduling and transmission of PWS (which includes ETWS and CMAS) messages (originated from the MME);

CSG handling.

The DeNB hosts the following functions in addition to the eNB functions:

S1/X2 proxy functionality for supporting RNs; and

S11 termination and S-GW/P-GW functionality for supporting RNs.

The MME hosts the following functions (see 3GPP TS 23.401 [17]):

NAS signaling;

NAS signaling security;

AS Security control;

Inter CN node signaling for mobility between 3GPP access networks;

Idle mode UE Reachability (including control and execution of paging retransmission);

Tracking Area list management (for UE in idle and active mode);

PDN GW and Serving GW selection;

MME selection for handovers with MME change;

SGSN selection for handovers to 2G or 3G 3GPP access networks;

Roaming;

Authentication;

Bearer management functions including dedicated bearer establishment; and

Support for PWS (which includes ETWS and CMAS) message transmission.

The Serving Gateway (S-GW) hosts the following functions (see 3GPP TS 23.401):

The local Mobility Anchor point for inter-eNB handover;

Mobility anchoring for inter-3GPP mobility;

E-UTRAN idle mode downlink packet buffering and initiation of network triggered service request procedure;

Lawful Interception;

Packet routing and forwarding;

Transport level packet marking in the uplink and the downlink;

Accounting on user and QCI granularity for inter-operator charging; and

UL and DL charging per UE, PDN, and QCI.

The PDN Gateway (P-GW) hosts the following functions (see 3GPP TS 23.401):

Per-user based packet filtering (by e.g. deep packet inspection);

Lawful Interception;

UE IP address allocation;

Transport level packet marking in the downlink;

UL and DL service level charging, gating and rate enforcement; and

DL rate enforcement based on APN-AMBR.

E-UTRAN supports relaying by having a Relay Node (RN) wirelessly connect to an eNB serving the RN, called Donor eNB (DeNB), via a modified version of the E-UTRA radio interface, the modified version being called the Un interface.

The RN supports the eNB functionality meaning it, among other things, terminates the radio protocols of the E-UTRA radio interface, and the S1 and X2 interfaces. From a specification point of view, functionality defined for eNBs also applies to RNs unless explicitly specified. In addition to the eNB functionality, the RN also supports a subset of the UE functionality, e.g. physical layer, layer-2, RRC, and NAS functionality, in order to wirelessly connect to the DeNB.

The RN connects to the DeNB via the Un interface using the same radio protocols and procedures as a UE connecting to an eNB. The following relay-specific functionality is supported in the control plane protocols:

The RRC layer of the Un interface has functionality to configure and reconfigure activate specific subframe configurations (e.g. DL subframe configuration) for transmissions between an RN and a DeNB, for RNs that are not able to transmit to/receive from their DeNB in all subframes. The DeNB is aware of which RNs require specific subframe configurations and initiates the RRC signalling for such configurations. The RN applies the configuration immediately upon reception (It should be noted that the subframe configuration on the Un interface and the subframe configuration in the RN cell can be temporarily misaligned, i.e. a new subframe configuration can be applied earlier by the RN on Un than in the RN cell);

The RRC layer of the Un interface has the functionality to send updated system information in a dedicated message to RNs that are not able to receive broadcast signalling from its DeNB in all subframes. The RN applies the received system information immediately; and One of the radio protocol layers of the Un interface has the functionality to set a target value at the RN for a parameter that is monitored by the RN and reflects the radio interface status in the RN, and to notify the DeNB with information corresponding to a difference between the target value and the monitored parameter. The DeNB controls a link parameter of the Un interface to the RN depending on the notified information.

INDUSTRIAL APPLICABILITY

This invention can be applied to a mobile communications system having at least one relay node.

REFERENCE SIGNS LIST

10 Base station
20 Relay node
30, 30A, 30B terminal (User equipment)
41 Radio access area (Macro cell)
42 Radio access area (Relay cell)
50 Mobility management entity
60 Core network
70 Higher-layer network
101 Radio communication section
102 Reception data processor
103 Communication section
104 Transmission data processor
105 Buffer
106 Scheduler
107 Target value setting controller
201 Access link radio communication section
202 Reception data processor
203 Backhaul link radio communication section
204 Transmission data processor 205 Buffer
206 Scheduler
207 Memory
301 Radio communication section
302 Reception data processor
303 Processor
304 Transmitted data controller
305 Transmission data processor

The invention claimed is:

1. A communication system comprising a plurality of nodes including a base station; at least one terminal; and at least one relay node through which each terminal can be connected to the base station, wherein
an entity in a network higher in layer than each relay node configures the relay node to set a target value for a predetermined parameter reflecting a radio link status of the relay node;
the relay node monitors the predetermined parameter to notify the upper-layer node of difference information corresponding to a difference between the target value and a monitored parameter value, and
the upper-layer node controls a link parameter of a radio link connecting to the upper-layer node and the relay node depending on the difference information.

2. The communication system according to claim 1, wherein the entity determines the target value for the relay node based on the radio link status indicating first link information of a first radio link and second link information of a second radio link, wherein the first radio link and the second radio link connect the relay node to an upper-layer node and a lower-layer node, respectively.

3. The communication system according to claim 2, wherein when a change has occurred in the first link information and/or the second link information, the entity determines the target value depending on the change.

4. The communication system according to claim 2, wherein the first link information includes a number of relay nodes connected to the upper-layer node, a transmission rate in the first radio link for the relay node, and an amount of radio resource available at the first radio link for the relay node.

5. The communication system according to claim 2, wherein the second link information includes a number of lower-layer nodes connected to the relay node, a transmission rate in the second radio link for each lower-layer node, and an amount of radio resource available at the second radio link for each lower-layer node.

6. The communication system according to claim 1, wherein the difference information has two states, wherein a first state is indicative of that the monitored parameter value is greater than the target value and a second state is indicative of that the monitored parameter value is smaller than the target value.

7. The communication system according to claim 1, wherein the difference information has three states, wherein a first state is indicative of that the monitored parameter value is greater than the target value, a second state is indicative of that the monitored parameter value is smaller than the target value, and a third state is indicative of that the monitored parameter value is neither greater nor smaller than the target value.

8. The communication system according to claim 1, wherein the difference information has more than three states each assigned a value corresponding to distinct units into the difference is divided.

9. The communication system according to claim 2, wherein when the difference between the target value and the monitored parameter value is greater than a predetermined value, the relay node notifies the upper-layer node of the difference information.

10. The communication system according to claim 1, wherein the predetermined parameter is an amount of data stored at the relay node for transmitting to the lower-layer node.

11. The communication system according to claim 2, wherein the predetermined parameter is a ratio between throughput of the second radio link and throughput of the first radio link.

12. The communication system according to claim 2, wherein the predetermined parameter is a difference between throughput of the second radio link and throughput of the first radio link.

13. The communication system according to claim 1, wherein the relay node receives lower-layer difference information from the lower-layer node and determines the difference information by referring to the lower-layer difference information to transmit the determined difference information to the upper-layer node.

14. A resource allocation control method in a communication system comprising a plurality of nodes including a base station; at least one terminal; and at least one relay node through which each terminal can be connected to the base station, the method comprising:
configuring each relay node to set a target value for a predetermined parameter reflecting a radio link status of the relay node,
at the relay node,
monitoring the predetermined parameter to notify the upper-layer node of difference information corresponding to a difference between the target value and a monitored parameter value, and
at the upper-layer node,
controlling a link parameter of a radio link connecting the upper-layer node and the relay node depending on the difference information.

15. The resource allocation control method according to claim 14, wherein the entity determines the target value for the relay node based on the radio link status indicating first link information of a first radio link and second link information of a second radio link, wherein the first radio link and the second radio link connect the relay node to an upper-layer node and a lower-layer node, respectively.

16. The resource allocation control method according to claim 15, wherein when a change has occurred in the first link information and/or the second link information, the entity determines the target value depending on the change.

17. The resource allocation control method according to claim 15, wherein the first link information includes a number of relay nodes connected to the upper-layer node, a transmission rate in the first radio link for the relay node, and an amount of radio resource available at the first radio link for the relay node.

18. The resource allocation control method according to claim 15, wherein the second link information includes a number of lower-layer nodes connected to the relay node, a transmission rate in the second radio link for each lower-layer node, and an amount of radio resource available at the second radio link for each lower-layer node.

19. The resource allocation control method according to claim 14, wherein the difference information has two states, wherein a first state is indicative of that the monitored parameter value is greater than the target value and a second state is indicative of that the monitored parameter value is smaller than the target value.

20. The resource allocation control method according to claim 14, wherein the difference information has three states, wherein a first state is indicative of that the monitored parameter value is greater than the target value, a second state is indicative of that the monitored parameter value is smaller than the target value, and a third state is indicative of that the monitored parameter value is neither greater nor smaller than the target value.

21. The resource allocation control method according to claim 14, wherein the difference information has more than three states each assigned a value corresponding to distinct units into the difference is divided.

22. The resource allocation control method according to claim 15, wherein when the difference between the target value and the monitored parameter value is greater than a predetermined value, the relay node notifies the upper-layer node of the difference information.

23. The resource allocation control method according to claim 15, wherein the relay node receives lower-layer difference information from the lower-layer node and determines the difference information by referring to the lower-layer difference information to transmit the determined difference information to the upper-layer node.

24. A base station in a communication system comprising a plurality of nodes including at least one terminal and at least one relay node through which each terminal can be connected to the base station, comprising:
 a target value setting controller for configuring each relay node to set a target value for a predetermined parameter reflecting a radio link status of the relay node; and
 a resource allocation controller for controlling a link parameter of a radio link to an adjacent relay node depending on difference information received from the adjacent relay node, wherein the adjacent relay node monitors the predetermined parameter to notify the base station of the difference information corresponding to a difference between the set target value and a monitored parameter value.

25. The base station according to claim 24, wherein the base station determines the target value for each relay node based on the radio link status indicating first link information of a first radio link and second link information of a second radio link, wherein the first radio link and the second radio link connect the relay node to an upper-layer node and a lower-layer node, respectively.

26. The base station according to claim 25, wherein when a change has occurred in the first link information and/or the second link information, the base station determines the target value depending on the change.

27. A relay node connecting with an upper-layer node via a first radio link and connecting with at least one lower-layer node via a second radio link, comprising:
 a memory for storing a target value for a predetermined parameter reflecting both statuses of the first radio link and the second radio link, wherein the target value is determined by an entity in a network higher in layer than the relay node;
 a link status comparator for comparing the target value and a monitored parameter value obtained by monitoring the predetermined parameter to produce difference information corresponding to a difference between the target value and a monitored parameter value; and
 a communication section for notifying the upper-layer node of the difference information so that the upper-layer node controls a link parameter of the first radio link depending on the difference information.

28. The relay node according to claim 27, wherein the difference information has two states, wherein a first state is indicative of that the monitored parameter value is greater than the target value and a second state is indicative of that the monitored parameter value is smaller than the target value.

29. The relay node according to claim 27, wherein the difference information has three states, wherein a first state is indicative of that the monitored parameter value is greater than the target value, a second state is indicative of that the monitored parameter value is smaller than the target value, and a third state is indicative of that the monitored parameter value is neither greater nor smaller than the target value.

30. The relay node according to claim 27, wherein the difference information has more than three states each assigned a value corresponding to distinct units into the difference is divided.

31. The relay node according to claim 27, wherein when the difference between the target value and the monitored parameter value is greater than a predetermined value, the link status comparator produces the difference information to notify the upper-layer node of the difference information.

32. The relay node according to claim 27, wherein the link status comparator determines the difference information by referring to lower-layer difference information received from the lower-layer node.

33. A resource allocation control method in a base station in a communication system comprising a plurality of nodes including at least one terminal and at least one relay node through which each terminal can be connected to the base station, comprising:
 configuring each relay node to set a target value for a predetermined parameter reflecting a radio link status of the relay node; and
 controlling a link parameter of a radio link to an adjacent relay node depending on difference information received from the adjacent relay node, wherein the adjacent relay node monitors the predetermined parameter to notify the base station of the difference information corresponding to a difference between the set target value and a monitored parameter value.

34. A communication control method in a relay node connecting with an upper-layer node via a first radio link and connecting with at least one lower-layer node via a second radio link, comprising:
 storing a target value for a predetermined parameter reflecting a radio link status of the relay node, wherein the target value is determined by an entity in a network higher in layer than the relay node;
 comparing the target value and a monitored parameter value obtained by monitoring the predetermined parameter to produce difference information corresponding to a difference between the target value and a monitored parameter value; and
 notifying the upper-layer node of the difference information so that the upper-layer node controls a link parameter of a radio link connecting the upper-layer node and the relay node depending on the difference information.

35. A non-transitory computer readable medium having stored thereon a program for implementing a resource allocation control function in a base station in a communication system comprising a plurality of nodes including at least one terminal and at least one relay node through which each terminal can be connected to the base station, comprising:
 configuring each relay node to set a target value for a predetermined parameter reflecting a radio link status of the relay node; and controlling a link parameter of a radio link to an adjacent relay node depending on difference information received from the adjacent relay node, wherein the adjacent relay node monitors the predetermined parameter to notify the base station of the difference information corresponding to a difference between the set target value and a monitored parameter value.

36. A non-transitory computer readable medium having stored thereon a program for implementing a communication control function in a relay node connecting with an upper-layer node via a first radio link and connecting with at least one lower-layer node via a second radio link, comprising:

storing a target value for a predetermined parameter reflecting both statuses of the first radio link and the second radio link, wherein the target value is determined by an entity in a network higher in layer than the relay node;

comparing the target value and a monitored parameter value obtained by monitoring the predetermined parameter to produce difference information corresponding to a difference between the target value and a monitored parameter value; and notifying the upper-layer node of the difference information so that the upper-layer node controls a link parameter of a radio link connecting the upper-layer node and the relay node depending on the difference information.

* * * * *